(12) United States Patent
Mogamiya

(10) Patent No.: US 7,164,528 B2
(45) Date of Patent: Jan. 16, 2007

(54) ELECTRONIC BINOCULARS

(75) Inventor: Makoto Mogamiya, Tokyo (JP)

(73) Assignee: PENTAX Corporation, Tokyo (JP)

(*) Notice: Subject to any disclaimer, the term of this patent is extended or adjusted under 35 U.S.C. 154(b) by 203 days.

(21) Appl. No.: 10/868,811

(22) Filed: Jun. 17, 2004

(65) Prior Publication Data

US 2004/0257648 A1 Dec. 23, 2004

(30) Foreign Application Priority Data

Jun. 20, 2003 (JP) .................... P2003-177296

(51) Int. Cl.
G02B 23/00 (2006.01)
(52) U.S. Cl. .................................... 359/412
(58) Field of Classification Search ............. 359/407, 359/408, 480, 482; 345/654
See application file for complete search history.

(56) References Cited

U.S. PATENT DOCUMENTS

| | | | | |
|---|---|---|---|---|
| 5,581,399 | A * | 12/1996 | Abe | 359/410 |
| 2001/0028498 | A1* | 10/2001 | Haga et al. | 359/407 |
| 2002/0034004 | A1* | 3/2002 | Khoshnevis et al. | 359/407 |
| 2006/0193039 | A1* | 8/2006 | Yamauchi et al. | 359/407 |

FOREIGN PATENT DOCUMENTS

| | | | |
|---|---|---|---|
| JP | 2624556 | | 4/1997 |
| JP | 09-258111 | * | 10/1997 |
| JP | 2001-281555 | | 10/2001 |
| JP | 2001-33312 | | 11/2001 |
| JP | 2002-182272 | * | 6/2002 |

* cited by examiner

Primary Examiner—Mark A. Robinson
Assistant Examiner—Scott Stephens
(74) Attorney, Agent, or Firm—Greenblum & Bernstein, P.L.C.

(57) ABSTRACT

Electronic binoculars comprise an imaging unit, and first and second ocular units. The imaging unit has an imaging device that projects an optical image of an object, and converts the optical image to electric signals. The first ocular unit has a first image-indicating device that indicates the object image based on the electric signals in a first image-indicating field. The second ocular unit has a second image-indicating device that indicates the object image based on the electric signals in a second image-indicating field. The first image-indicating field is smaller than a first effective image-indicating area which is the maximum image-indicating area of the first image-indicating device. The second image-indicating field is smaller than a second effective image-indicating area which is the maximum image-indicating area of the second image-indicating device. The respective first and second image-indicating fields can move within the respective first and second effective image-indicating areas.

8 Claims, 20 Drawing Sheets

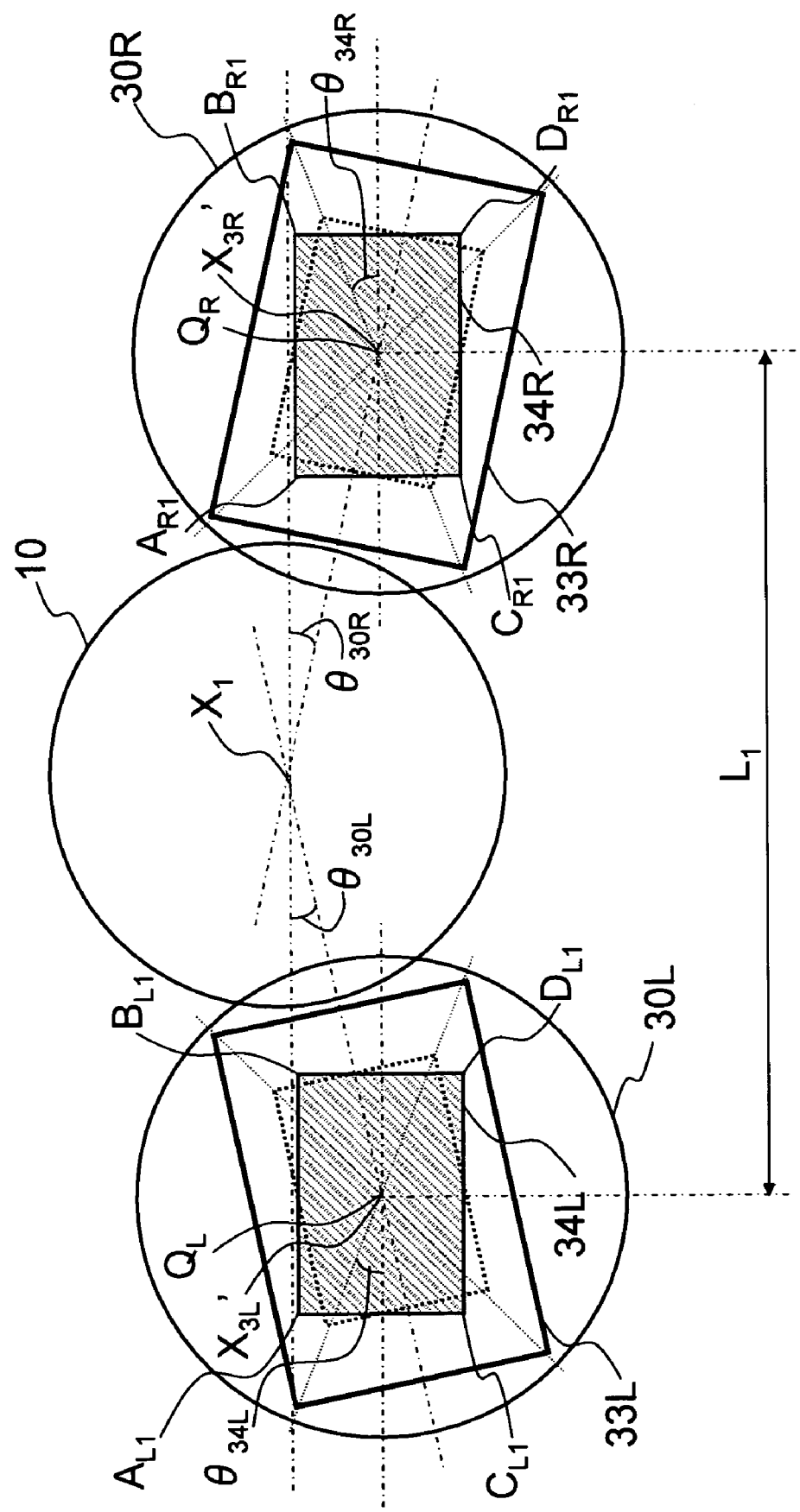

Fig.7

| The number of times | The rotating angle | | | | | |
|---|---|---|---|---|---|---|
| | Pattern (1) | Pattern (2) | Pattern (3) | Pattern (4) | Pattern (5) | ⋮ |
| 0 times | 0 degrees | 0 degrees | 0 degrees | 0 degrees | 0 degrees | ⋮ |
| 1 time | 1 degree | 2 degrees | 3 degrees | 4 degrees | 5 degrees | ⋮ |
| 2 times | 2 degrees | 4 degrees | 6 degrees | 8 degrees | 10 degrees | ⋮ |
| 3 times | 3 degrees | 6 degrees | 9 degrees | 12 degrees | 15 degrees | ⋮ |
| 4 times | 4 degrees | 8 degrees | 12 degrees | 16 degrees | 20 degrees | ⋮ |
| 5 times | 5 degrees | 10 degrees | 15 degrees | 20 degrees | 25 degrees | ⋮ |
| 6 times | 6 degrees | 12 degrees | 18 degrees | 24 degrees | 30 degrees | ⋮ |
| 7 times | 7 degrees | 14 degrees | 21 degrees | 28 degrees | 35 degrees | ⋮ |
| 8 times | 8 degrees | 16 degrees | 24 degrees | 32 degrees | 40 degrees | ⋮ |
| 9 times | 9 degrees | 18 degrees | 27 degrees | 36 degrees | 45 degrees | ⋮ |
| ... | ... | ... | ... | ... | ... | |

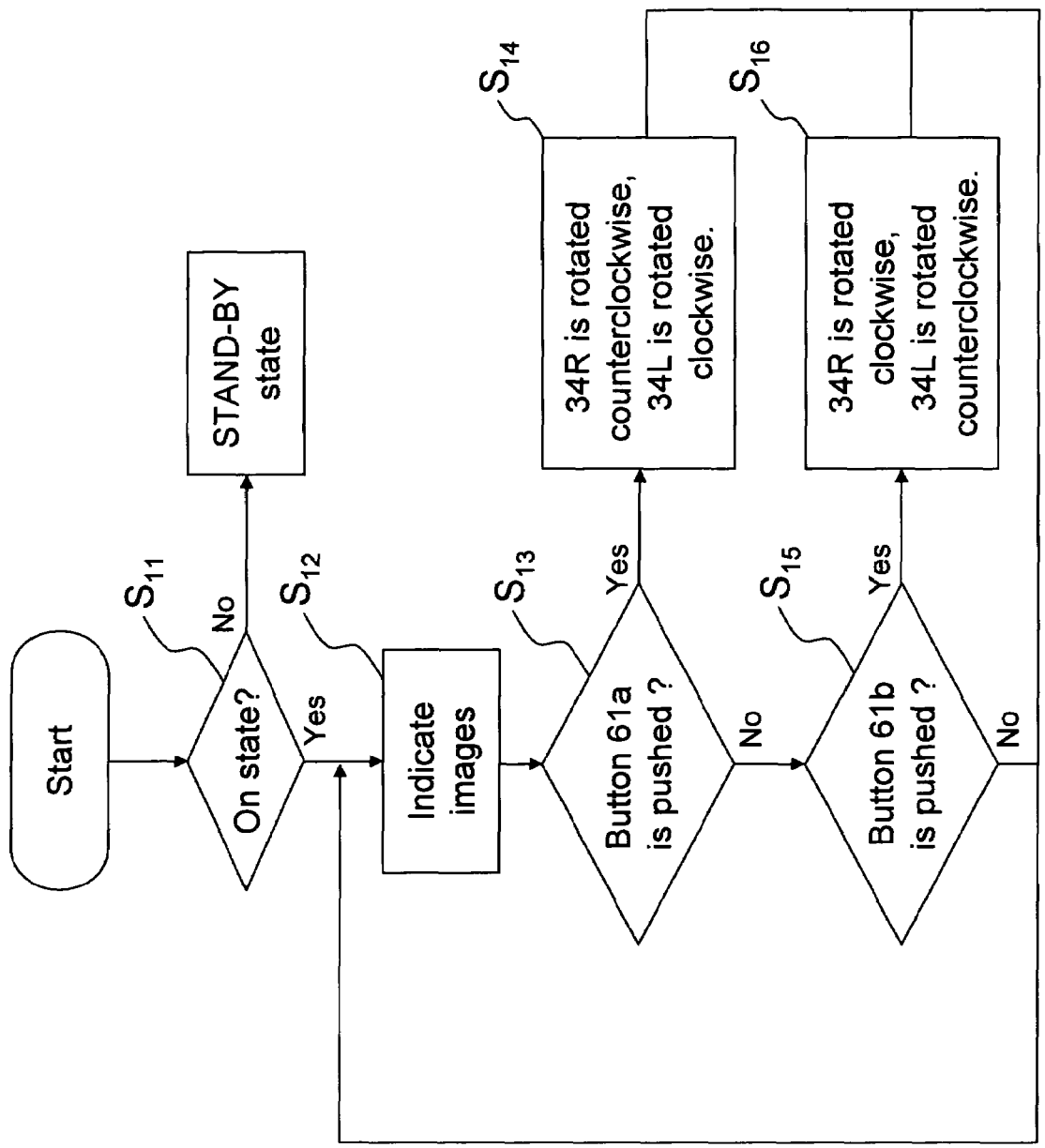

ELECTRONIC BINOCULARS

BACKGROUND OF THE INVENTION

1. Field of the Invention

The present invention relates to electronic binoculars, and in particular to leveling an image-indicating field of an ocular unit, inclined by adjusting an inter-pupillary distance between a pair of ocular units of the electronic binoculars.

2. Description of the Related Art

When binoculars are used, the ocular units of the binoculars are moved according to the following methods and the inter-pupillary distance is adjusted: (1) rotating the left ocular unit and the right ocular unit about an axis of the imaging optical device; (2) sliding the left ocular unit and right ocular unit in a direction parallel to a line connecting the ocular optical axis of the left ocular unit and the ocular optical axis of the right ocular unit.

When an observer adjusts an inter-pupillary distance while holding the binoculars described in (1) only one hand is necessary, while for the binoculars described in (2) two hands are always necessary.

In addition, the type (1) binoculars can have a 2-axial rotary system, so that the axis of rotation is independent for the left ocular unit and the right ocular unit, or can have a 1-axial rotary system, so that the axis of rotation of the left and right ocular units is common.

However, electronic binoculars are proposed that are capable of recording image data in a storage medium and further that have the advantage of night vision. The electronic binoculars are generally provided with an optical system, a photographing lens system, an imaging device, and ocular units. The imaging device converts an optical image produced by the optical system to electric signals. The ocular units have image-indicating devices that display the object image according to the electric signals.

The imaging devices, such as CCDs, and the image-indicating devices, such as LCDs, both have a generally rectangular shape. Therefore, when the observer adjusts an inter-pupillary distance of the type (1) binoculars, the image-indicating devices are inclined by the angle of rotation of the ocular units. Therefore, the images indicated on the image-indicating devices are inclined. It is not comfortable for an observer, to observe an object in this situation.

Japanese unexamined patent publication (KOKAI) No. 2001-281555 discloses electronic binoculars provided with ocular units which can be rotated about their respective ocular optical axes in order to level the inclined image-indicating devices, as is known in the art. According to the disclosed binoculars, for binoculars provided with ocular units including rectangular image-indicating devices, leveling the inclined image-indicating devices horizontally, or leveling the inclined images indicated on the image-indicating devices horizontally, can be done by rotating the ocular units to a proper angle.

SUMMARY OF THE INVENTION

However, the ocular units of the above-discussed conventional electronic binoculars are rotated mechanically, when leveling the inclined images indicated on the image-indicating devices horizontally. Therefore, a mechanism which rotates the ocular units about their respective ocular optical axes, to level the inclined image-indicating devices horizontally, is provided in addition to the mechanism which rotates the ocular units about an axis or axes, which is/are parallel to the respective ocular optical axes, to adjust an inter-pupillary distance. So, the total mechanism of the binoculars is cumbersome and complicated.

Therefore, an object of the present invention is to provide binoculars that can horizontally level the inclined images indicated on the image-indicating device, without using a complicated mechanism, when the ocular units are rotated to adjust an inter-pupillary distance.

According to the present invention, electronic binoculars comprise an imaging unit, a first ocular unit, and a second ocular unit.

The imaging unit has an imaging device that projects an optical image of an object, obtained by a photographing optical system, and converts the optical image to electric signals. The first ocular unit has a first image-indicating device that indicates the object image, based on the electric signals, in a first image-indicating field. The second ocular unit has a second image-indicating device that indicates the object image, based on the electric signals, in a second image-indicating field. The first image-indicating field is smaller than a first effective image-indicating area which is the maximum image-indicating area of the first image-indicating device. The second image-indicating field is smaller than a second effective image-indicating area which is the maximum image-indicating area of the second image-indicating device. The first image-indicating field is able to move within the first effective image-indicating area. The second image-indicating field is able to move within the second effective image-indicating area.

BRIEF DESCRIPTION OF THE DRAWINGS

The objects and advantages of the present invention will be better understood from the following description, with reference to the accompanying drawings in which:

FIG. 6 is a plane view similar to FIG. 5, but where the image-indicating fields are leveled horizontally, after the adjustment of an inter-pupillary distance;

FIG. 7 is a substitution table showing the amount by which each image-indicating field is rotated, every time the operation button is pushed, in the first embodiment;

FIG. 8 is a flowchart showing the process by which image-indicating fields are rotated, after the adjustment of an inter-pupillary distance, in the first embodiment;

DESCRIPTION OF THE PREFERRED EMBODIMENTS

Figure 1:
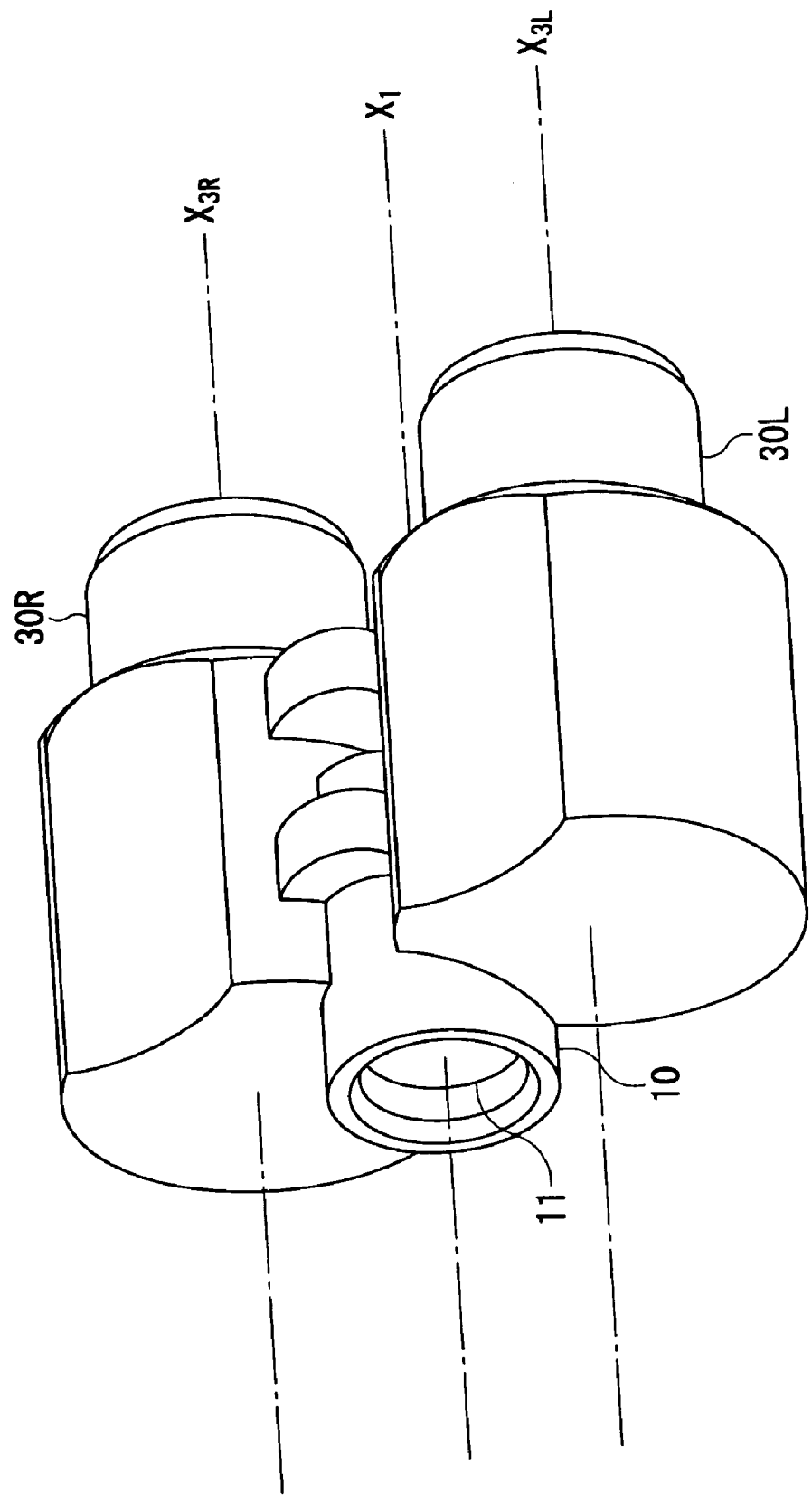
FIG. 1 is a perspective view of an electronic binoculars in a first embodiment, viewed from the imaging unit side.
Figure 2:
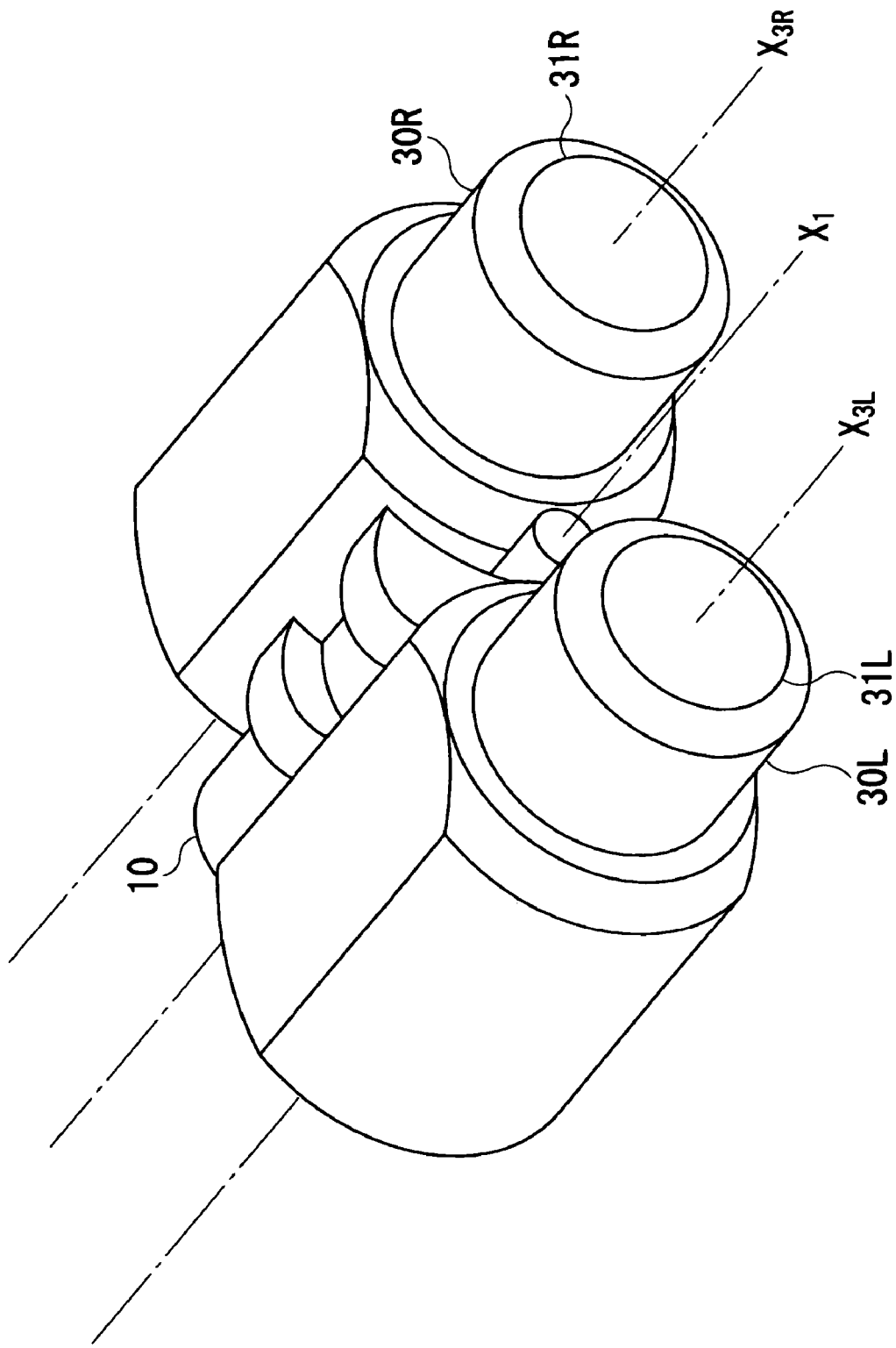
FIG. 2 is a perspective view of the electronic binoculars in the first embodiment viewed from the ocular units side.
Figure 3:
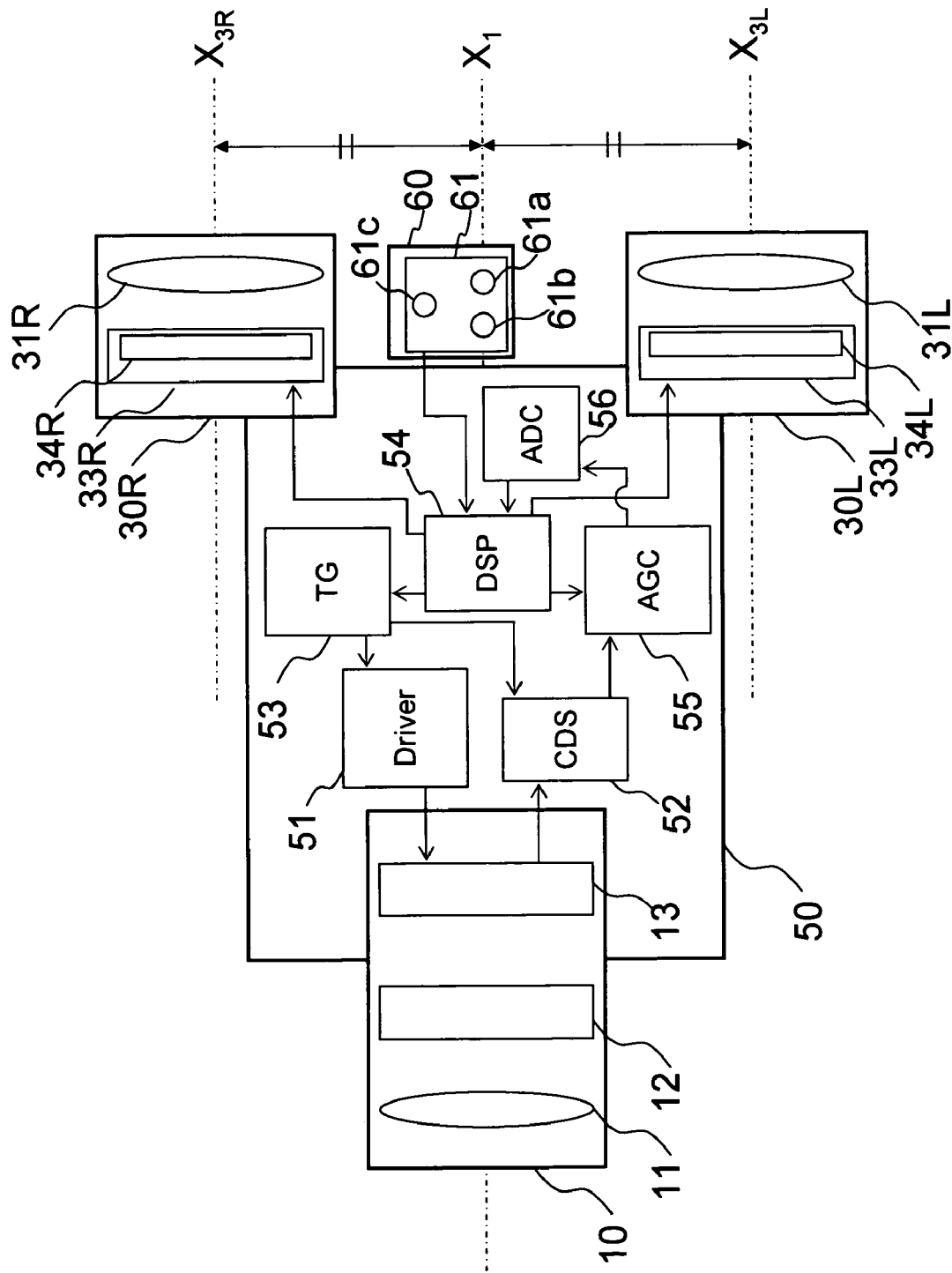
FIG. 3 is a block diagram of the electronic binoculars of the first embodiment.

The present invention is described below with reference to the embodiments shown in the drawings. As shown in FIGS. 1 to 3, electronic binoculars relating to a first embodiment are provided with an imaging unit 10, right and left ocular units 30R and 30L, an image-signal processing unit 50, and a controller 60. Both the right and left ocular units 30R and 30L have similar constructions. The right and left ocular units 30R and 30L are connected to the imaging unit 10, the image-signal processing unit 50, and the controller 60 via a connecting mechanism so that a distance between the ocular optical axes $X_{3R}$ and $X_{3L}$ of the respective ocular optical systems is adjusted.

The imaging unit 10 is provided with a photographing lens system 11, a filter system 12 including an infrared cut-off filter, an optical low-pass filter, and the like, and an imaging device 13, such as a CCD. The imaging device 13 converts an optical image that is magnified through the photographing lens system 11 and the filter system 12, and which is projected onto the imaging device 13, to electric signals. The imaging unit 10 may include a focusing mechanism, which is not depicted in the figures.

The right ocular unit 30R includes a right image-indicating device 33R, such as an LCD, and a right ocular lens system 31R. The right image-indicating device 33R displays an image corresponding to image signals fed from the image-signal processing unit 50 on a right image-indicating field 34R. Namely, an observer observes the image displayed on the right image-indicating field 34R through the right ocular lens system 31R. Similarly, the left ocular unit 30L includes a left image-indicating device 33L and a left ocular lens system 31L. The left image-indicating device 33L displays an image on a left image-indicating field 34L.

The right and left image-indicating fields 34R and 34L have rectangular shapes. The right and left image-indicating devices 33R and 33L have rectangular shapes. The right image-indicating field 34R is smaller than an effective image-indicating area which is a right maximum image-indicating area of the right image-indicating device 33R, and is included within the right maximum image-indicating area. The left image-indicating field 34L is smaller than an effective image-indicating area which is a left maximum image-indicating area of the left image-indicating device 33L, and is included within the left maximum image-indicating area.

The imaging unit 10 has an imaging optical axis $X_1$. The right and left ocular units have right and left ocular optical axes $X_{3R}$ and $X_{3L}$. The imaging optical axis $X_1$ is located between the right and left ocular optical axes $X_{3R}$ and $X_{3L}$, so that the imaging optical axis $X_1$ is parallel to the right and left ocular optical axes $X_{3R}$ and $X_{3L}$. A distance from the imaging optical axis $X_1$ to the right ocular optical axis $X_{3R}$ is the same as a distance from the imaging optical axis $X_1$ to the left ocular optical axis $X_{3L}$.

The right and left ocular units 30R and 30L are able to rotate about the imaging optical axis $X_1$ via a connecting mechanism. The right and left ocular units 30R and 30L have sector gears, which are not depicted in the figures, so that the connecting mechanism connects with these sector gears. When one of the ocular units is rotated, another ocular unit interlocks, so that it is rotated at the same angle in the opposite direction about the imaging optical axis $X_1$, by the connecting mechanism.

Figure 4:
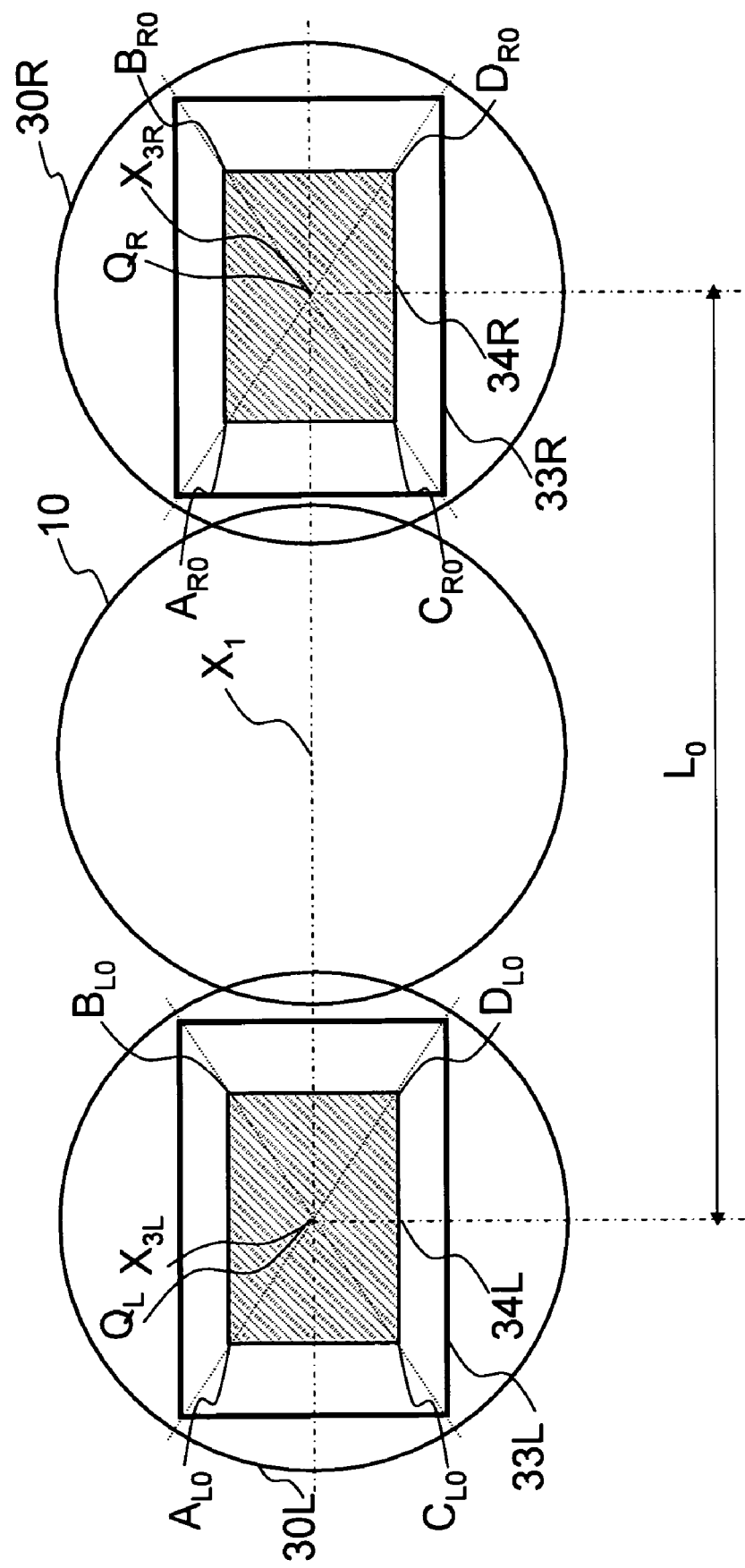
FIG. 4 is a plane view from the ocular units side of the binoculars of the first embodiment, showing the inclined condition of the image-indicating devices, and also the image-indicating fields, when the ocular units are at their maximum inter-pupillary distance.
Figure 5:
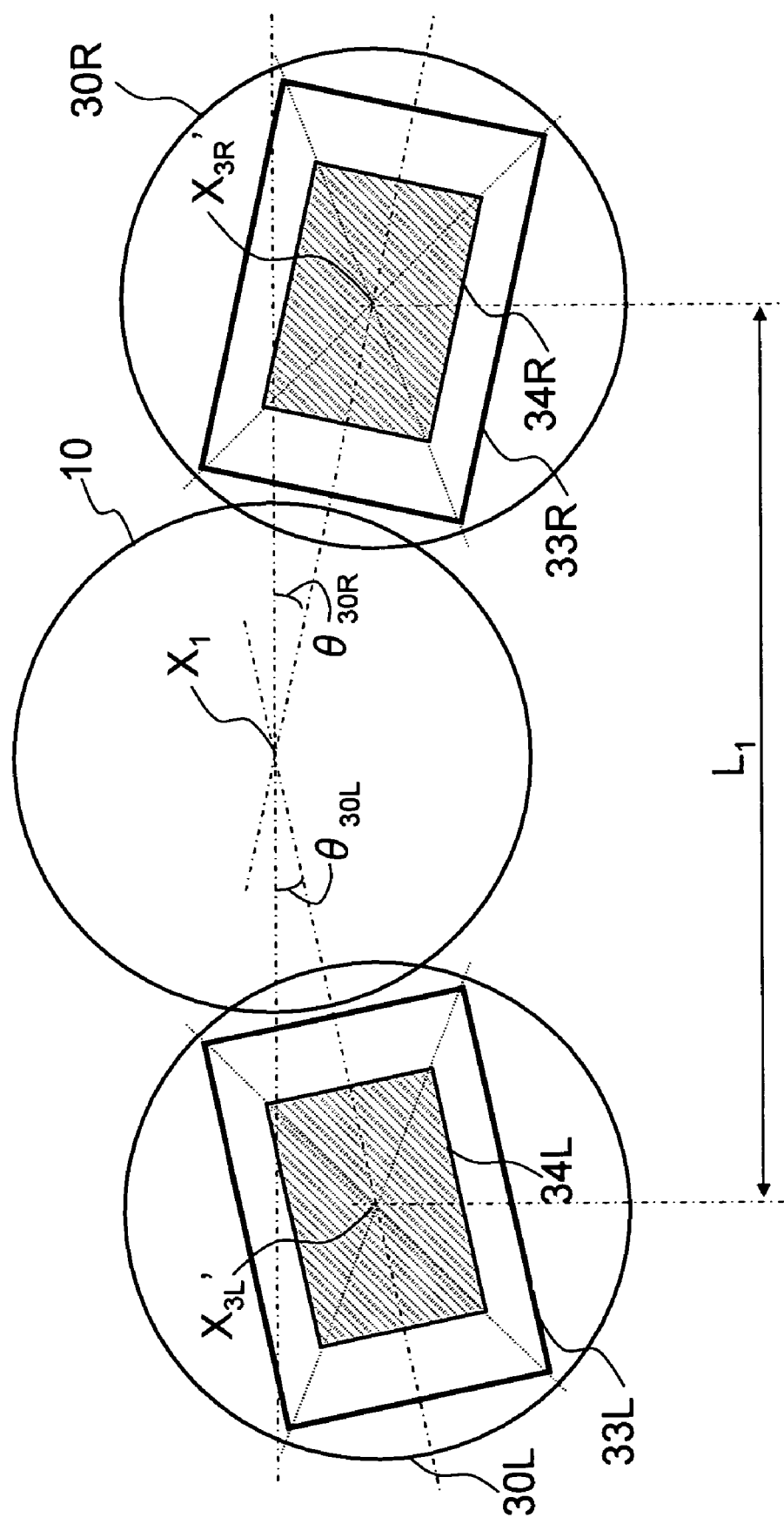
FIG. 5 is a plane view from the ocular units side of the binoculars of the first embodiment, showing the inclined condition of the image-indicating devices, and also the image-indicating fields, when the ocular units are at a distance other than the maximum inter-pupillary distance.

The right image-indicating field 34R is able to rotate about an axis (a first or third field axis) that passes through a center $Q_R$ of the right image-indicating field 34R within the right effective image-indicating area of the right image-indicating device 33R, and which is parallel to the imaging optical axis $X_1$. The left image-indicating field 34L is able to rotate about an axis (a second or fourth field axis) that passes through a center $Q_L$ of the left image-indicating field 34L within the left effective image-indicating area of the left image-indicating device 33L, and which is parallel to the imaging optical axis $X_1$. As shown in FIGS. 4 to 6, in the first embodiment, a center of the right image-indicating device 33R and the center $Q_R$ of the right image-indicating field 34R coincide with each other, to maximize the rotating range of the right image-indicating field 34R within the effective image-indicating area of the right image-indicating device 33R, so that the centers pass through the right ocular optical axis $X_{3R}$ or $X_{3R}'$. The relationship between the left image-indicating device 33L, the image-indicating field 34L, and also the left ocular optical axis $X_{3L}$ or $X_{3L}'$ is similar.

The image-signal processing unit 50 includes an imaging device driver 51, a correlated double sampling circuit (CDS) 52, a timing generator (TG) 53, a digital signal processor (DSP) 54, an auto-gain controller (AGC) 55, and an analog-digital converter (ADC) 56. Namely, the electric signals for an optical image of an object, which are generated in the imaging unit 10, are converted by the image-signal processing unit 50 to image signals which can be displayed, by the right and left ocular units 30R and 30L, and are supplied to them by the image-signal processing unit 50. Further, the image-signal processing unit 50 may include a function that converts the electric signals to different types of image signals (for example, compressed image signals) for recording the image signals in an external storing medium, which is not depicted in the figures.

The controller 60 has an image-indicating field rotating operation unit 61 which rotates the right and left image-indicating fields 34R and 34L within the effective image-indicating areas of the respective right and left image-indicating devices 33R and 33L.

The image-indicating field rotating operation unit 61 has operation buttons 61a and 61b, and a sliding operation member 61c. When the operation button 61a is pushed, the image-indicating field rotating operation unit 61 rotates the right and left image-indicating fields 34R and 34L in the opposite directions by the same angle. When the operation button 61b is pushed, the image-indicating field rotating operation unit 61 rotates the right and left image-indicating fields 34R and 34L in the opposite directions to which they were rotated when the operation button 61a was pushed, and by the same angle by which they were rotated when the operation button 61a was pushed. When the sliding operation member 61c is operated, a value of an angle by which the image-indicating field rotating operation unit 61 rotates the right and left image-indicating fields 34R and 34L, when either the operation button 61a or 61b is pushed once, is adjusted.

Next, after the photographic subject image is captured by the imaging unit 10, the operation of each component, in the right and left ocular units 30R and 30L, will be explained.

Optical object images obtained through the photographing lens system 11 and the filter system 12 are projected on the light receiving area of the imaging device 13, and are then subjected to photoelectrical conversion, so that the electric signals corresponding to electric charge accumulated during a predetermined period in the imaging device 13, are generated. The value of the electric charge accumulation period is controlled by the imaging device driver 51.

The noise components of the electric signals which are produced by the photoelectrical conversion are reduced by the correlated double sampling circuit 52. Further, the gain of the electric signals is controlled by the auto-gain controller 55. The electric signals are then converted to digital signals by the analog-digital converter 56. These operations are carried out in accordance with clock pulse signals fed from the timing generator 53 to the imaging device driver 51 and the correlated double sampling circuit 52.

The converted digital signals (or digital image signals) are subjected to image processes, such as a gamma correction process and so on, in the digital signal processor 54.

The image signals which were subjected to the image processes, in other words, the image signals which were processed in the image-signal processing unit 50, are supplied to the right and left image-indicating devices 33R and 33L provided in the respective right and left ocular units 30R and 30L by the image-signal processing unit 50.

The right and left image-indicating devices 33R and 33L display an image corresponding to the image signals in the respective right and left image-indicating fields 34R and 34L, so that the observer can observe the image using their right and left eyes, via the respective right and left ocular lens systems 31R and 31L.

Next, the inter-pupillary distance adjusting process of the electronic binoculars, which means adjusting the distance from the right ocular optical axis $X_{3R}$ to the left ocular optical axis $X_{3L}$, will be explained.

FIG. 4 is a plane view from the ocular units side showing the rotation of the right and left ocular units 30R and 30L, the right and left image-indicating devices 33R and 33L, and the right and left image-indicating fields 34R and 34L, where the right and left ocular units 30R and 30L are rotated about the imaging optical axis $X_1$ for the adjustment of an inter-pupillary distance.

FIG. 4 shows the condition where the inter-pupillary distance is maximum, in other words, the condition where the right and left ocular optical axes $X_{3R}$ and $X_{3L}$, and the imaging optical axis $X_1$ are lined up on the same plane. This condition is the initial state, and the value of the inter-pupillary distance in this position is $L_0$. Furthermore, the right image-indicating field 34R is rectangular and has parallel sides to the right effective image-indicating area of the right image-indicating device 33R. The right image-indicating field 34R is enclosed between the boundaries given by the 4 points $A_{R0}$, $B_{R0}$, $C_{R0}$, and $D_{R0}$. Similarly, the left image-indicating field 34L is defined as the field which is enclosed between the boundaries given by the 4 points $A_{L0}$, $B_{L0}$, $C_{L0}$, and $D_{L0}$. The coordinates of each point are computed when the image-indicating field rotating operation unit 61 rotates each point that is shown in the respective right and left image-indicating fields 34R and 34L in this initial state, about their respective centers $Q_R$ and $Q_L$, according to a prescribed computation process, and then the image-indicating field rotating operation unit 61 provides the image-indicating fields after the rotation.

FIG. 5 shows the condition in which the right and left ocular units 30R and 30L are rotated in their respective opposite directions, to make the inter-pupillary distance narrower than the maximum inter-pupillary distance. The value of the inter-pupillary distance in this position is indicated as $L_1$.

FIG. 6 shows the condition in which the inclined right and left image-indicating fields 34R and 34L are rotated about their axes which pass through their respective centers $Q_R$ and $Q_L$, and which are parallel to the imaging optical axis $X_1$. Namely, the right image-indicating field 34R is defined as the field which is enclosed between the boundaries given by the 4 points $A_{R1}$, $B_{R1}$, $C_{R1}$, and $D_{R1}$. Similarly, the left image-indicating field 34L is defined as the field which is enclosed between the boundaries given by the 4 points $A_{L1}$, $B_{L1}$, $C_{L1}$, and $D_{L1}$. The inclinations of the right and left image-indicating fields 34R and 34L are horizontally leveled, while the inclinations of the right and left image-indicating devices 33R and 33L are fixed.

FIG. 7 is a table showing the number of degrees by which the right and left image-indicating fields 34R and 34L are rotated after pushing the operation button 61a or 61b once. The table is stored in the controller 60. Several patterns are available for determining how many degrees the image-indicating fields should be rotated after pushing the operation button once. In this embodiment, the size of the angle of rotation when the operation button is pushed once is determined by the location of the sliding operation member 61c. For example, when pattern (1) in the table is selected, the right image-indicating field 34R is rotated 1 degree counterclockwise and the left image-indicating field 34L is rotated 1 degree clockwise, after pushing the operation button 61a once, when viewed from the side of the right and left ocular units 30R and 30L. When pattern (2) in the table is selected, the right image-indicating field 34R is rotated 2 degrees counterclockwise and the left image-indicating field 34L is rotated 2 degrees clockwise, after pushing the operation button 61a once, when viewed from the side of the right and left ocular units 30R and 30L.

Next, the adjustment of the inter-pupillary distance for the first embodiment of the present invention will be explained. When the respective right and left ocular units 30R and 30L are rotated about the imaging optical axis $X_1$, the respective right and left image-indicating fields 34R and 34L which are displayed on the respective right and left image-indicating devices 33R and 33L, are also rotated. Accordingly, the right and left image-indicating fields 34R and 34L are inclined.

As shown in FIG. 5, the inclination of the right image-indicating field 34R, and the inclination of the left image-indicating field 34L are in opposite directions respectively. It is not comfortable for an observer, to observe under these conditions.

In the adjustment of an inter-pupillary distance, because the right image-indicating field 34R and the right ocular unit 30R are rotated together, and the left image-indicating field 34L and the left ocular unit 30L are rotated together, the rotated angle of the right image-indicating field 34R from the initial state, and the rotated angle $\theta_{30R}$ of the right ocular unit 30R from the initial state, have the same value and the same direction. Similarly, the rotated angle of the left image-indicating field 34L from the initial state, and the rotated angle $\theta_{30L}$ of the left ocular unit 30L from the initial state, have the same value and the same direction. These rotated angles $\theta_{30R}$ and $\theta_{30L}$ have the same value, but opposite directions due to the symmetry of the figure.

Accordingly, a right rotating angle $\theta_{34R}$ of the right image-indicating field 34R, which is required to horizontally level the right image-indicating field 34R, and the right rotating angle $\theta_{30R}$ of the right ocular unit 30R have the same value but have opposite directions. Further a left rotating angle $\theta_{34L}$ of the left image-indicating field 34L, which is required to horizontally level the left image-indicating field 34L, and the left rotating angle $\theta_{30L}$ of the left ocular unit 30L have the same value and opposite directions, hence the right and left rotating angles $\theta_{30R}$ and $\theta_{30L}$ have the same value and opposite directions ($\theta_{30R}=-\theta_{30L}=-\theta_{34R}=\theta_{34L}$).

The operation button 61a is pushed by the observer to horizontally level the inclined right and left image-indicating fields 34R and 34L.

Each point $A_{R0}$, $B_{R0}$, $C_{R0}$, and $D_{R0}$ that is shown in the right image-indicating field 34R in the initial state, is a right initial value. Each point $A_{L0}$, $B_{L0}$, $C_{L0}$, and $D_{L0}$ that is shown in the left image-indicating field 34L in the initial state is a left initial value. Each point $A_{R0}$, $B_{R0}$, $C_{R0}$, and $D_{R0}$ is rotated by a requested angle about an axis which passes through the center $Q_R$ of the right image-indicating field 34R, and which is parallel to the imaging optical axis $X_1$. Each point $A_{R1}$, $B_{R1}$, $C_{R1}$, and $D_{R1}$ is shown in the right image-indicating field 34R after the rotation. Each point $A_{L0}$, $B_{L0}$, $C_{L0}$, and $D_{L0}$ is rotated by a requested angle about an axis which passes through the center $Q_L$ of the left image-indicating field 34L, and which is parallel to the imaging optical axis $X_1$. Each point $A_{L1}$, $B_{L1}$, $C_{L1}$, and $D_{L1}$ is shown in the left image-indicating field 34L after the rotation. The requested angle of rotation for the right image-indicating field 34R and the requested angle of rotation for the left image-indicating field 34L have same value, but are in opposite directions. The image-indicating field rotating operation unit 61 computes the coordinates of each point $A_{R1}$, $B_{R1}$, $C_{R1}$, $D_{R1}$, $A_{L1}$, $B_{L1}$, $C_{L1}$, and $D_{L1}$, and decides the right and left image-indicating fields 34R and 34L after the rotation.

The image-indicating field 34R and 34L are rotated by the same angle, but in opposite directions, when the observer pushes the operation button 61a or 61b (see FIG. 6). It is possible to carry out the operation that horizontally levels the inclined right and left image-indicating fields 34R and 34L by using the eye of the observer; that is, by simply looking at the right and left image-indicating devices 33R and 33L in the respective right and left ocular units 30R and 30L. If the operation button 61a is pushed too many times by the observer so that the right and left image-indicating fields 34R and 34L are rotated further than the level condition, the operation button 61b is pushed a required number of times by the observer, so that the image-indicating fields 34R and 34L are rotated in the opposite direction and leveled horizontally.

The process of this action will be explained with reference to the flowchart in FIG. 8. First of all, in the step $S_{11}$, it is judged whether or not the power supply of the electronic binoculars is in the ON state. When the power supply is not switched to the ON state, the binoculars are kept in the STAND-BY state. When the power supply is switched to the ON state, the photographic subject image, which was captured, is indicated in the right and left image-indicating fields 34R and 34L, in step $S_{12}$. In step $S_{13}$, it is judged whether or not the operation button 61a is pushed. When the ocular units 30R and 30L are rotated about the imaging optical axis $X_1$ for adjusting an inter-pupillary distance, the observer pushes the operation button 61a. In step $S_{14}$, when the operation button 61a is pushed, the right image-indicating field 34R is rotated counterclockwise when viewed from the ocular units side, or at the same angle and in the opposite direction to which the right ocular unit 30R is rotated. Further, the left image-indicating field 34L is rotated clockwise when viewed from the ocular units side, or by the same angle and in the opposite direction to which the left ocular unit 30L is rotated. Next, the process is returned to step $S_{12}$. When the operation button 61a is not pushed, it is judged whether or not the operation button 61b is pushed in step $S_{15}$. When the operation button 61b is pushed, the right image-indicating field 34R is rotated clockwise, and the left image-indicating field 34L is rotated counterclockwise, in step $S_{16}$, when viewed from the side of the right and left ocular units 30R and 30L. The rotation angle $\theta_{34R}$ of the right image-indicating field 34R, and the rotation angle $\theta_{34L}$ of the left image-indicating field 34L are the same. Next, the process is returned to the step $S_{12}$. When the operation button 61b is not pushed, the process is returned to step $S_{12}$.

Consequently, according to the first embodiment, when the ocular units 30R and 30L are rotated about the imaging optical axis $X_1$, so that the image-indicating devices 33R and 33L are inclined, the observer can observe comfortably because the image-indicating fields 34R and 34L, on which the images are indicated, are horizontally leveled by the observer.

Figure 9:
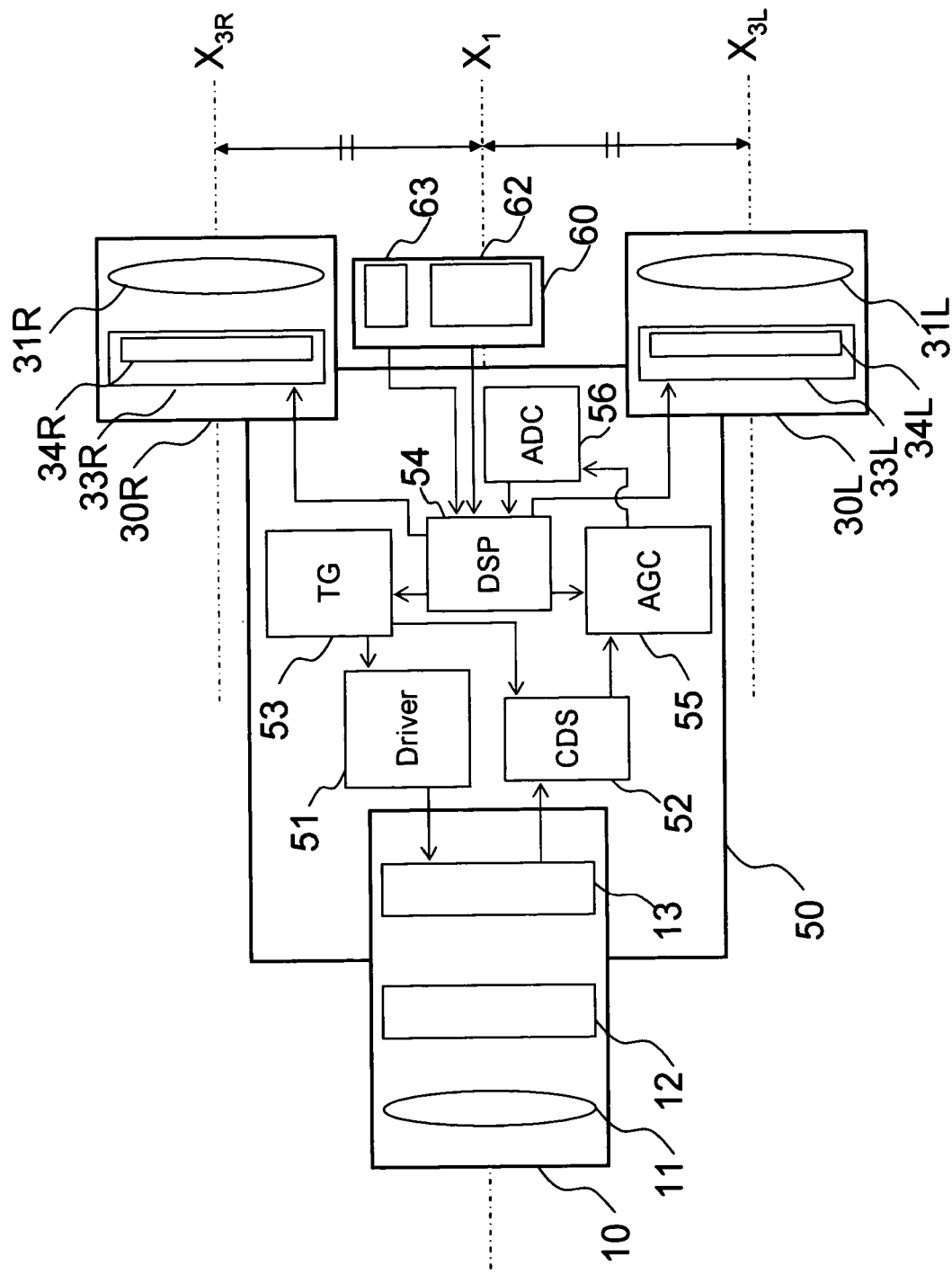
FIG. 9 is a block diagram of the electronic binoculars of a second embodiment.

Next, the second embodiment of the present invention will be explained. As shown in FIG. 9, the difference in structure to the first embodiment is that the controller 60 of the second embodiment has an angle of rotation sensor 62, and an automatic image-indicating field rotating unit 63, instead of the image-indicating field rotating operation unit 61 as shown in FIG. 3. Further, only the constructions dissimilar to those in the first embodiment will be explained in the following.

When the photographic subject image is captured by the imaging unit 10, the operation of each component in the right and left ocular units 30R and 30L, is identical to that in the first embodiment.

Figure 10:
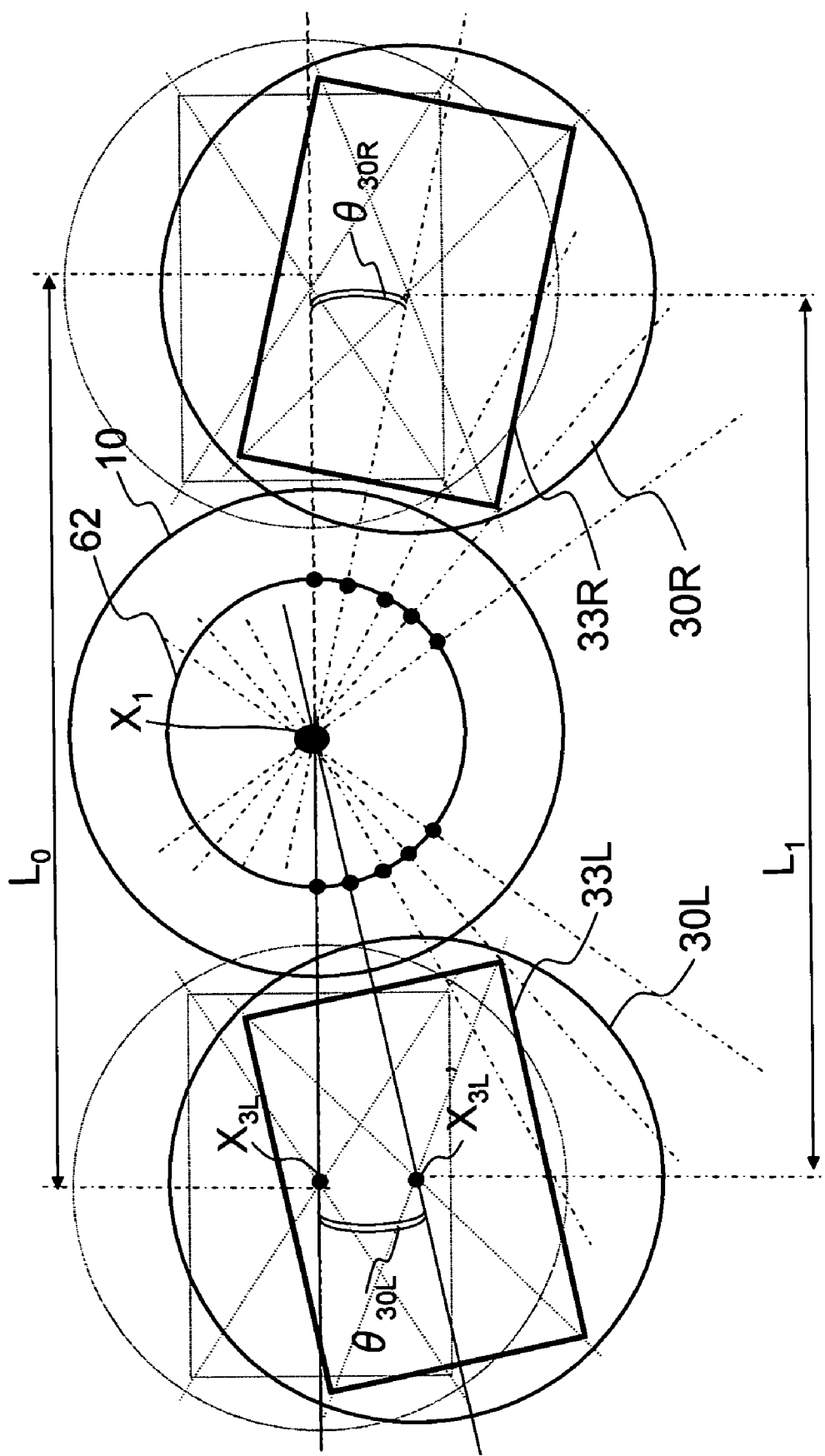
FIG. 10 is a plane view of the ocular units, the image-indicating devices, and an angle of rotation sensor during the adjustment of the inter-pupillary distance, viewed from the ocular units side, in the second embodiment.

This angle of rotation sensor 62 is an apparatus that detects the rotation angle of the ocular unit, and is arranged on a plane which is vertical to the imaging optical axis $X_1$. The angle of rotation sensor 62 can detect the angle $\theta_{30L}$ between a plane which includes both the imaging optical axis $X_1$ and the left ocular optical axis $X_{3L}$, before an adjustment of an inter-pupillary distance in the initial state, and a plane which includes both the imaging optical axis $X_1$ and the left ocular optical axis $X_{3L}'$, after an adjustment of an inter-pupillary distance (see FIG. 10).

Figure 11:
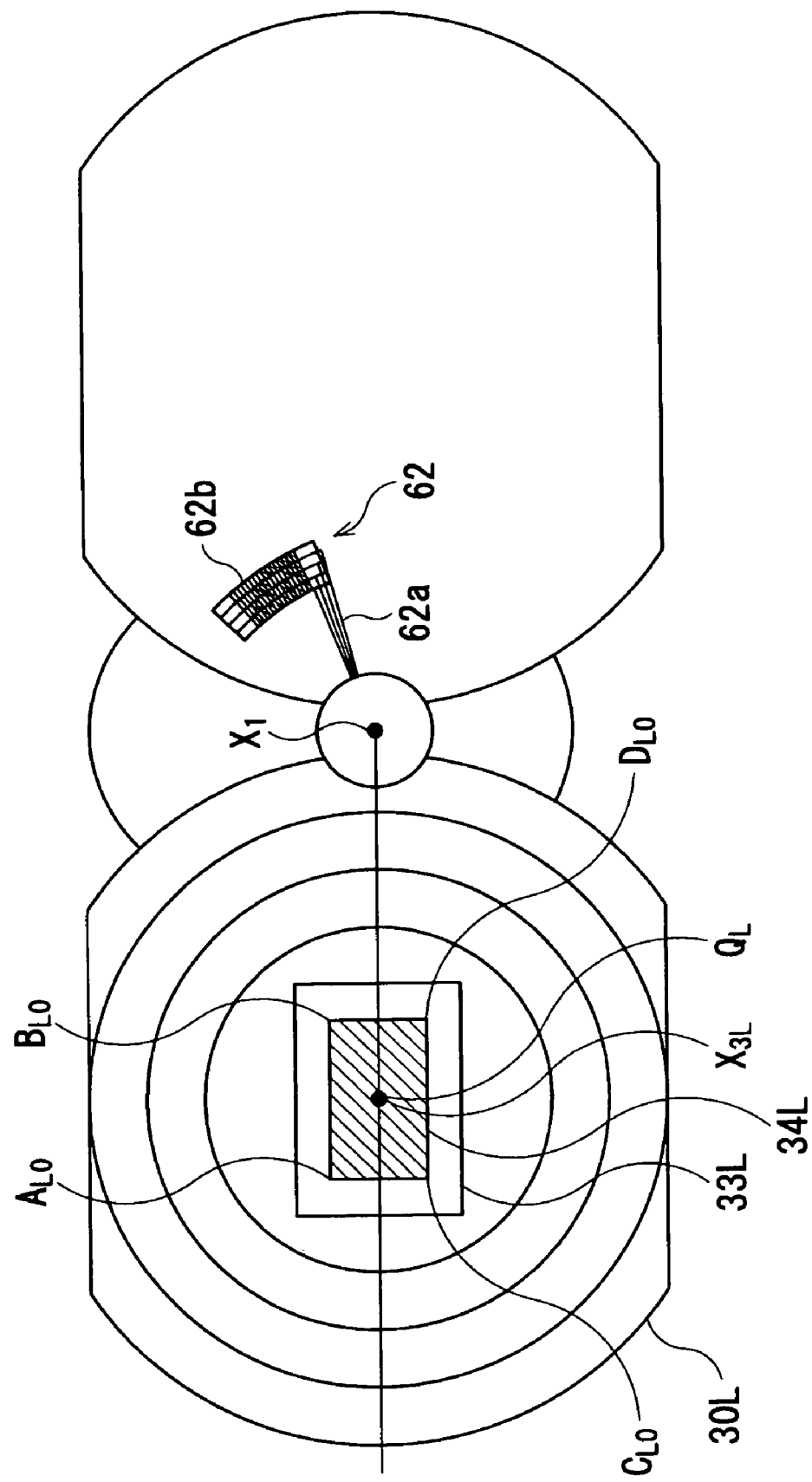
FIG. 11 is a plane view of the ocular units, the left image-indicating device, the left image-indicating field, and the angle of rotation sensor, before the adjustment of an inter-pupillary distance, viewed from the ocular units side, in the second embodiment.
Figure 12:
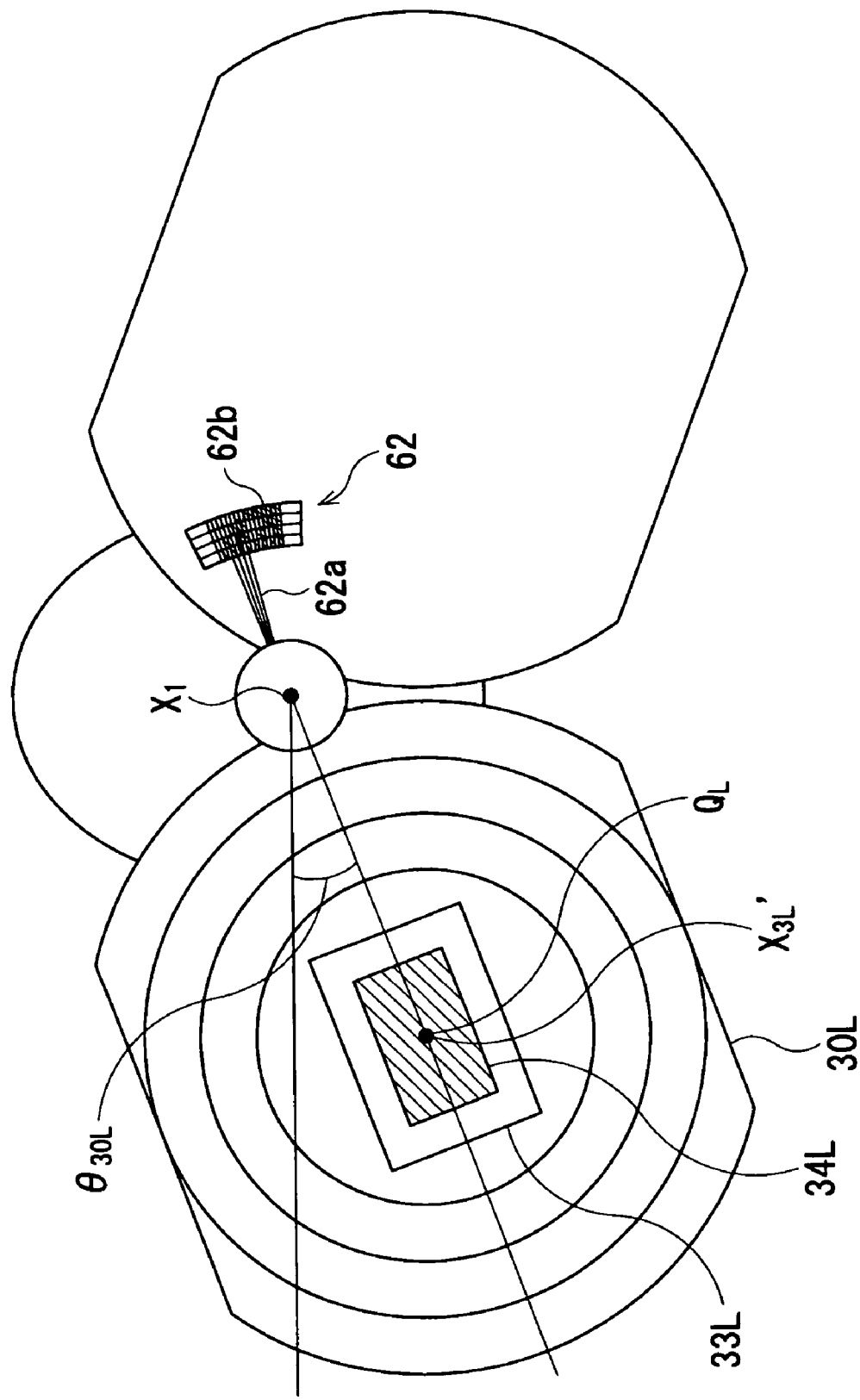
FIG. 12 is a plane view of the ocular units, the left image-indicating device, the left image-indicating field, and the angle of rotation sensor, after the adjustment of an inter-pupillary distance, viewed from the ocular units side, in the second embodiment.
Figure 13:
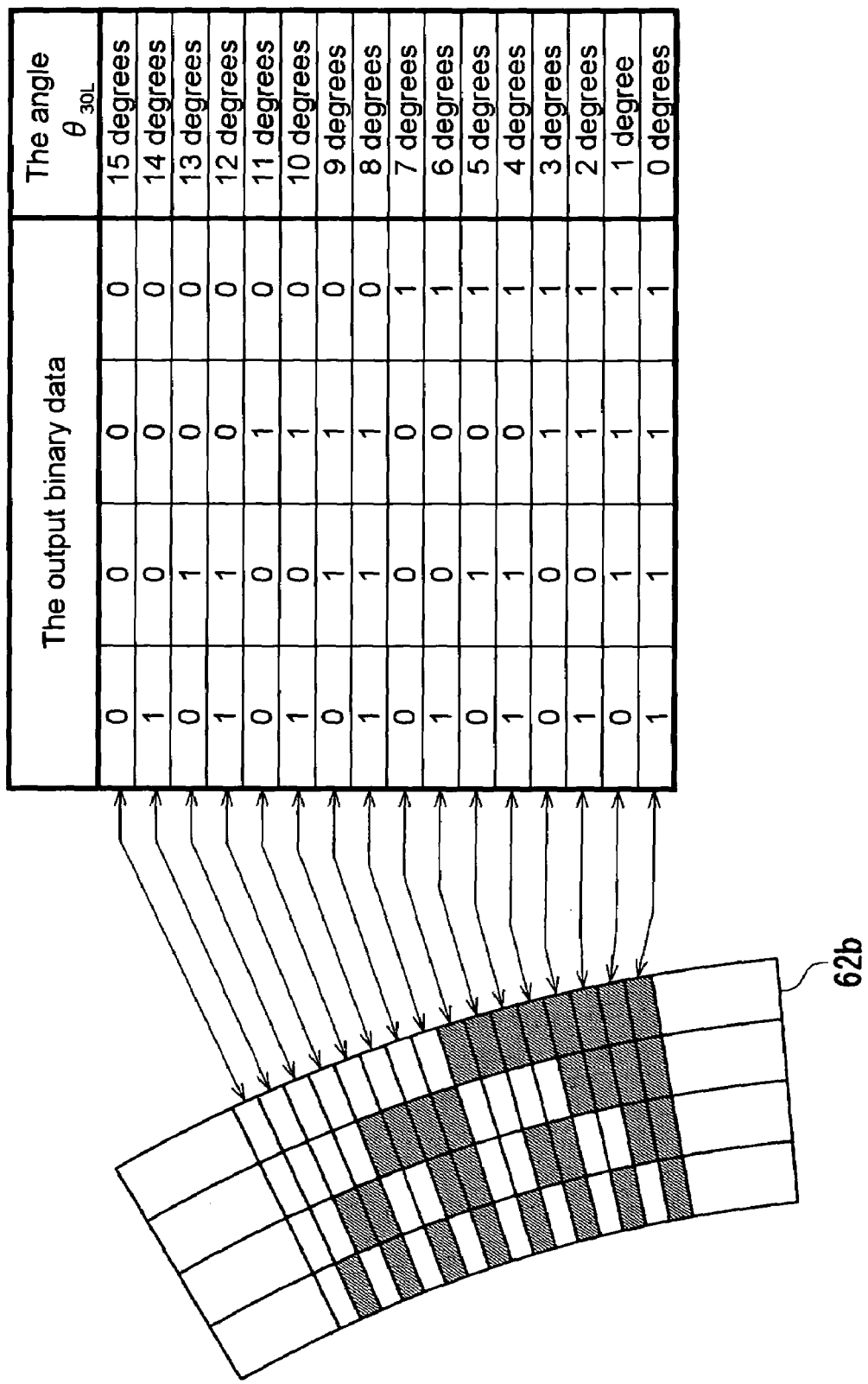
FIG. 13 is a substitution table showing the output data for the point of contact of a brush and a code board, and the rotating angle, in the second embodiment.

The embodiment is shown in FIGS. 11 to 13. The angle of rotation sensor 62 has a brush 62a and a code board 62b, so that when the brush 62a contacts the code board 62b by rotating the left ocular unit 30L, binary data (digital data) is output, and then the left rotating angle $\theta_{30L}$ corresponding to the output data is computed. The relationship between the digital output data and the left rotating angle $\theta_{30L}$ is stored in the controller 60, and it is used for the computation. For example, when the digital output data is 1, 1, 0, and 0, due to the contact between the brush 62a and the code board 62b, the value of the left rotating angle is 12 degrees. In this embodiment, the right rotating angle need not be detected separately, because the relationship between the right and left rotating angles $\theta_{30R}$ and $\theta_{30L}$ of the respective right and left ocular units 30R and 30L is $\theta_{30R} = -\theta_{30L}$.

The automatic image-indicating field rotating unit 63 can horizontally level the inclined right and left image-indicating fields 34R and 34L by using the detected angle $\theta_{30L}$, or, the automatic image-indicating field rotating unit 63 can compute the coordinates of each point, when each point $A_{L0}$, $B_{L0}$, $C_{L0}$, and $D_{L0}$ that is shown in the left image-indicating field 34L in the initial state, is rotated by the detected angle $\theta_{30L}$, and decides the left image-indicating field 34L after the rotation. As shown in the FIGS. 5 and 6, the automatic image-indicating field rotating unit 63 horizontally levels the inclined right image-indicating field 34R by rotating it by the angle $\theta_{30L}$ and in the same direction to the detected angle $\theta_{30L}$. Similarly, the automatic image-indicating field rotating unit 63 horizontally levels the inclined left image-indicating field 33R by rotating it by the same angle in the opposite direction to the detected angle $\theta_{30L}$.

Figure 14:
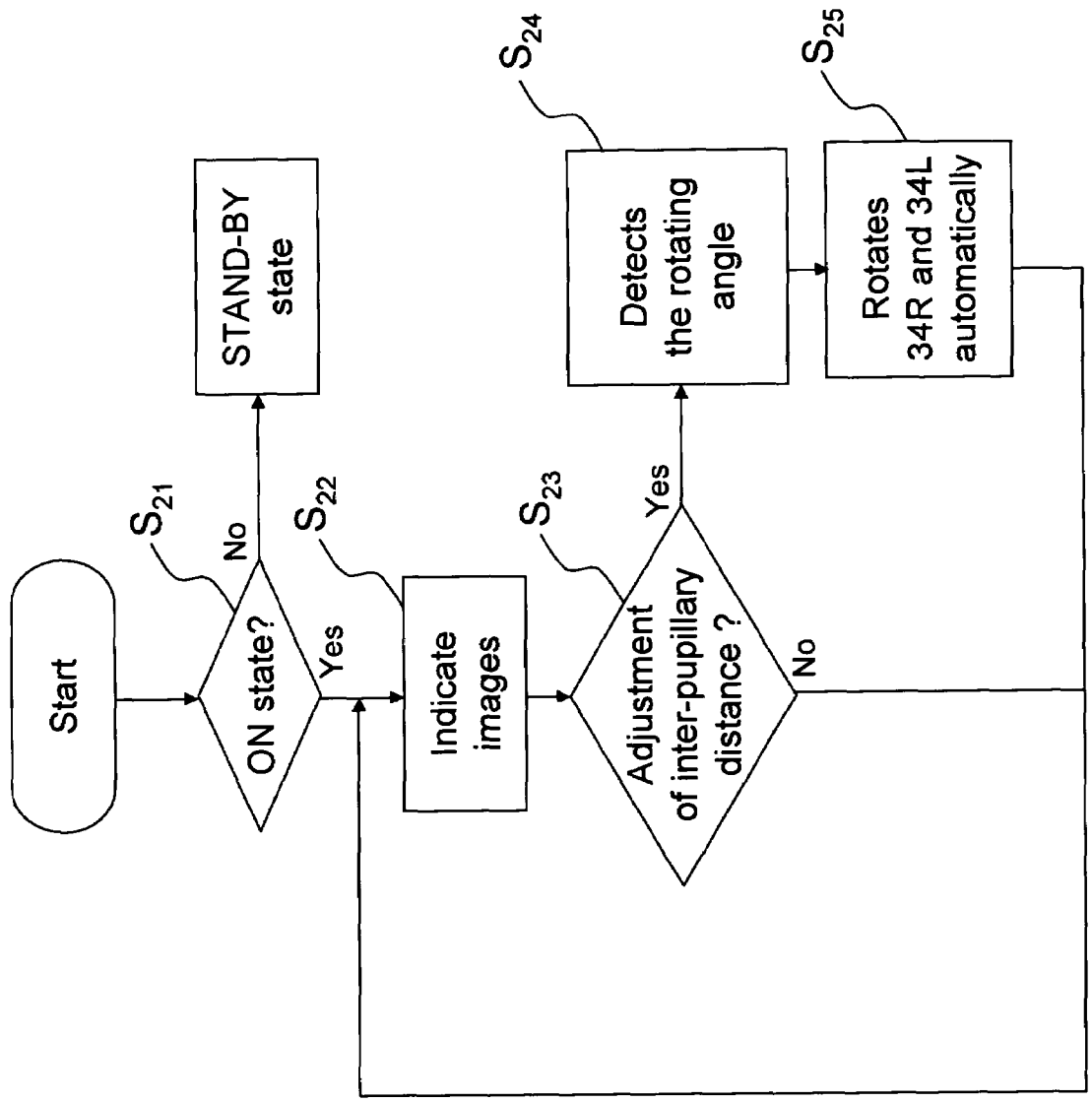
FIG. 14 is a flowchart showing the process by which image-indicating fields are rotated automatically, after the adjustment of an inter-pupillary distance, in the second embodiment.

The process of this action will be explained with reference to the flowchart in FIG. 14. First of all, in the step $S_{21}$, it is judged whether or not the power supply of the electronic binoculars is in the ON state. When the power supply is not switched to the ON state, the binoculars are kept in the STAND-BY state. When the power supply is switched to the ON state, the photographic subject image, which was captured, is indicated in the right and left image-indicating fields 34R and 34L, in step $S_{22}$. In step $S_{23}$, it is judged whether or not the adjustment of the inter-pupillary distance has been carried out, that is whether the right and left ocular units 30R and 30L have been rotated about the imaging optical axis $X_1$. When the right and left ocular units 30R and 30L are rotated, the angle of rotation sensor 62 detects the left rotating angle $\theta_{30L}$, in step $S_{24}$. In step $S_{25}$, the automatic image-indicating field rotating unit 63 rotates the right and left image-indicating fields 34R and 34L by using the detected left rotating angle $\theta_{30L}$, and then the process is returned to step $S_{22}$. When the right and left ocular units 30R and 30L are not rotated, the process is returned to step $S_{22}$.

Consequently, according to the second embodiment, when the ocular units 30R and 30L are rotated about the imaging optical axis $X_1$, so that the image-indicating fields 34R and 34L are inclined, the observer can observe comfortably because the image-indicating fields 34R and 34L, on which the images are indicated, are horizontally leveled automatically.

Figure 15:
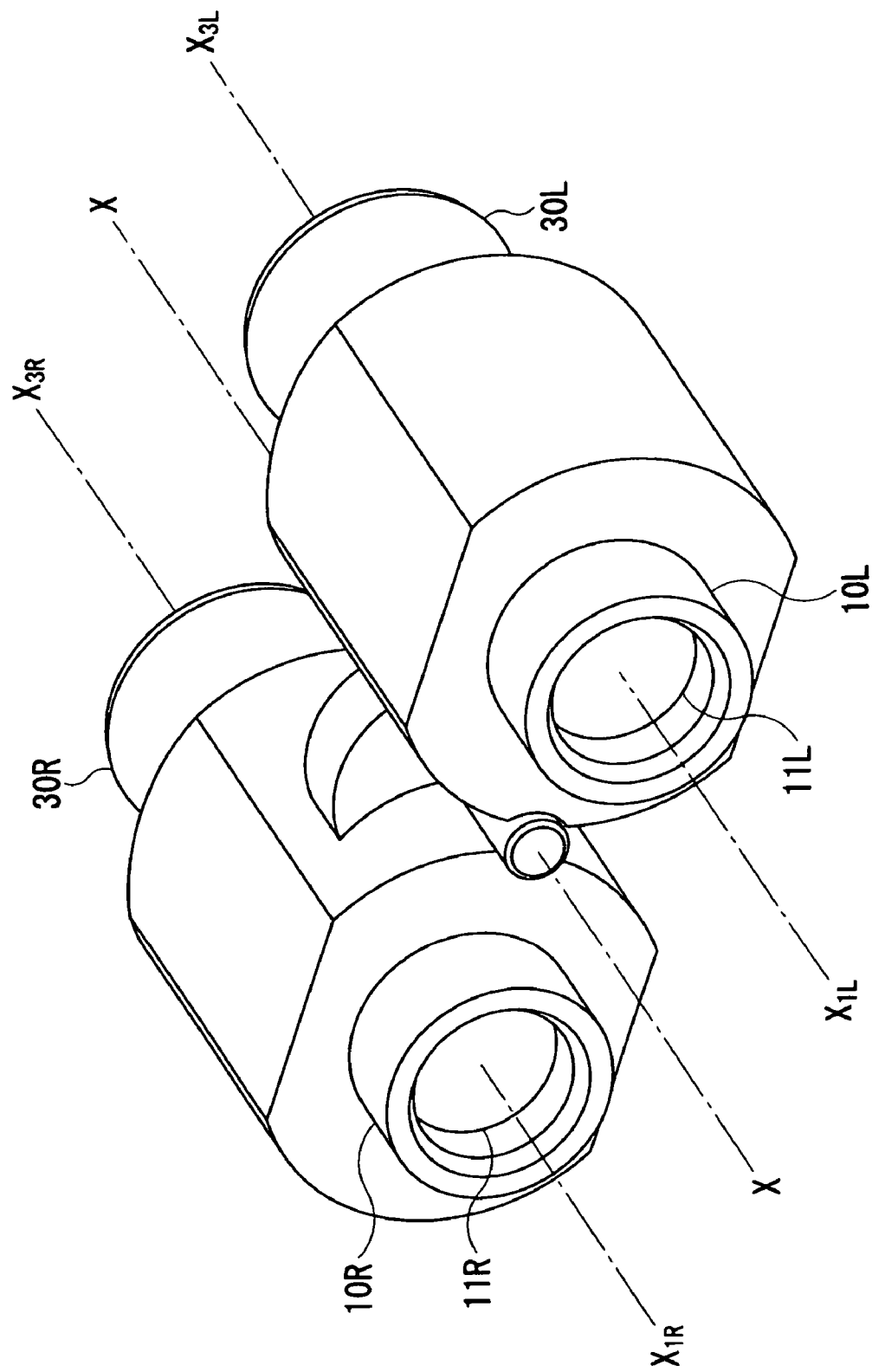
FIG. 15 is a perspective view of the electronic binoculars of a third embodiment viewed from the imaging units side.
Figure 16:
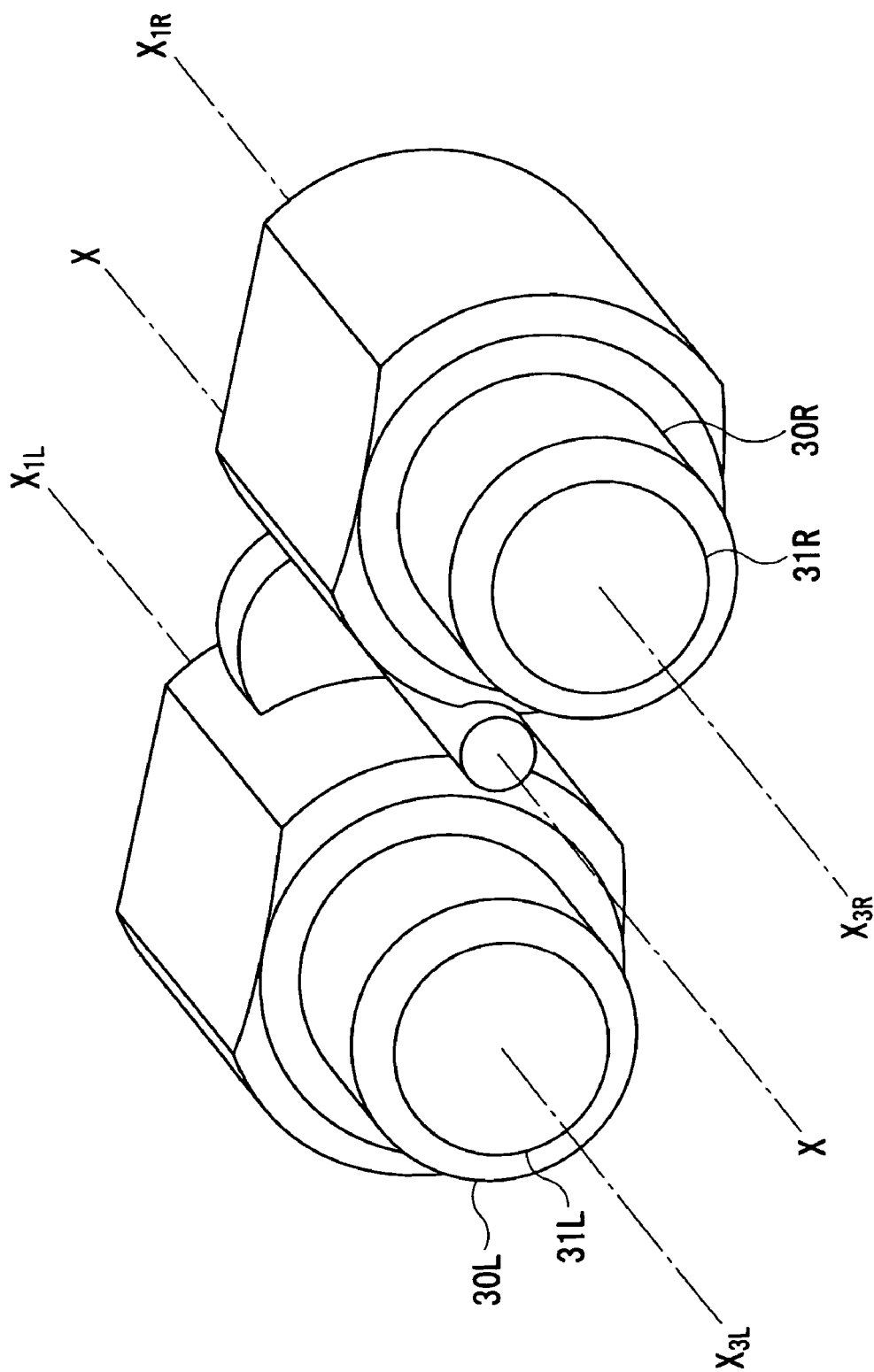
FIG. 16 is a perspective view of the electronic binoculars of the third embodiment viewed from the ocular units side.
Figure 17:
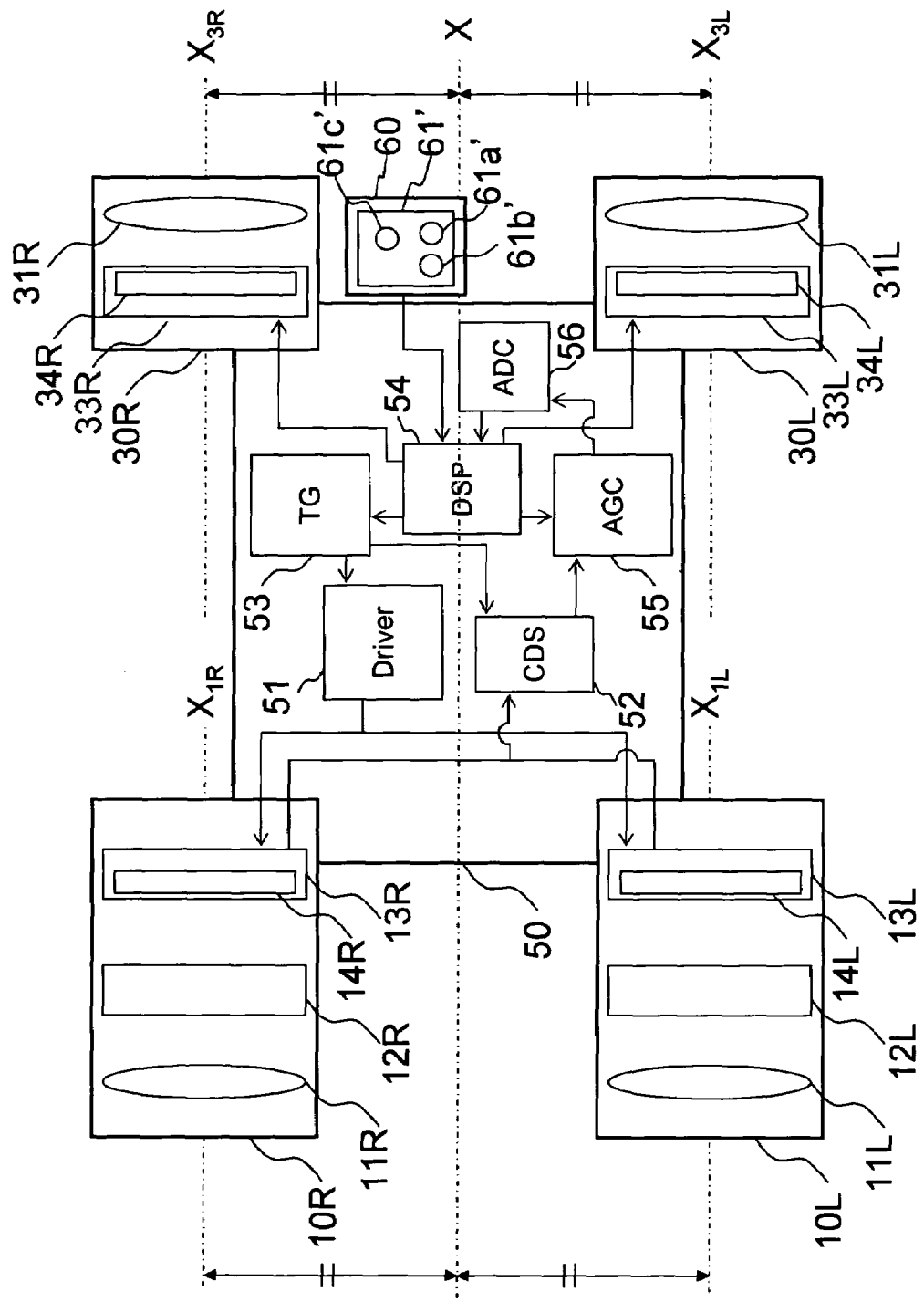
FIG. 17 is a block diagram of an electronic binoculars of the third embodiment.

Next, the third embodiment of the present invention will be explained. As shown in FIGS. 15 to 17, the difference in structure to the first embodiment is that the electronic binoculars of the third embodiment comprise right and left imaging units 10R and 10L. Further, only the constructions dissimilar to those in the first embodiment will be explained in the following.

The right and left imaging units 10R and 10L have similar constructions, they are connected to the right and left ocular units 30R and 30L, the image-signal processing unit 50, and the controller 60 via the connecting mechanism so that a distance between the optical axes of the respective imaging optical systems, and the distance between the optical axes of the respective ocular optical systems, are adjusted. The right imaging unit 10R is provided with a right photographing lens system 11R, a right filter system 12R, and a right imaging device 13. The right imaging device 13R converts an optical image that is magnified through the right photographing lens system 11R and the right filter system 12R, and which is projected onto the right imaging field 14R, to electric signals. Similarly, the left imaging device 13L converts an optical image that is magnified through the left photographing lens system 11L and the left filter system 12L, and which is projected onto the left imaging field 14L, to electric signals.

The right and left imaging fields 14R and 14L have rectangular shapes. The right and left imaging devices 13R and 13L have respective shapes. The right imaging field 14R is smaller than an effective imaging area which is a right maximum imaging area of the right imaging device 13R, and is included within the right maximum imaging area. The left imaging field 14L is smaller than an effective imaging area which is a left maximum imaging area of the left imaging device 13L, and is included within the left maximum imaging area.

The right and left imaging units 10R and 10L have right and left imaging optical axes $X_{1R}$ and $X_{1L}$. The right and left imaging optical axes $X_{1R}$ and $X_{1L}$ are parallel to the right and left ocular optical axes $X_{3R}$ and $X_{3L}$ of the respective right and left ocular units 30R and 30L.

The electric binoculars have a rotating axis X. The rotating axis X is located between the right and left imaging optical axes $X_{1R}$ and $X_{1L}$, so that the rotating axis X is parallel to the right and left imaging optical axes $X_{1R}$ and $X_{1L}$. Similarly, the rotating axis X is located between the right and left imaging optical axes $X_{3R}$ and $X_{3L}$, so that the rotating axis X is parallel to the right and left ocular optical axes $X_{3R}$ and $X_{3L}$. A distance from the rotating axis X to the right imaging optical axis $X_{1R}$ is the same as a distance from the rotating axis X to the left imaging optical axis $X_{1L}$. Similarly, a distance from the rotating axis X to the right ocular optical axis $X_{3R}$ is the same as a distance from the rotating axis X to the left ocular optical axis $X_{3L}$.

The right and left ocular units 30R and 30L are able to rotate about the rotating axis X via a connecting mechanism. The construction of the connecting mechanism is identical to the mechanism for the right and left ocular units 30R and 30L in the first embodiment.

The right image-indicating field 34R is able to rotate about an axis (a first or third field axis) that passes through a center $Q_R$ of the right image-indicating field 34R within a right effective image-indicating area of the right image-indicating device 33R, and that is parallel to the rotating axis X. The left image-indicating field 34L is able to rotate about an axis (a second or fourth field axis) that passes through a center $Q_L$ of the left image-indicating field 34L within a left effective image-indicating area of the left image-indicating device 33L, and that is parallel to the rotating axis X. In this embodiment, a center of the right image-indicating device 33R and the center $Q_R$ of the right image-indicating field 34R coincide with each other, to maximize the rotating range of the right image-indicating field 34R within the effective image-indicating area of the right image-indicating device 33R, so that the centers pass through the right ocular optical axis $X_{3R}$ or $X_{3R}'$. The relationship between the left image-indicating device 33L, the image-indicating field 34L, and also the left ocular optical axis $X_{3L}$ or $X_{3L}'$ is similar.

The right and left imaging units 10R and 10L are able to rotate about the rotating axis X via a connecting mechanism. The connecting mechanism between the right and left imaging units 10R and 10L is similar to that between the right and left ocular units 30R and 30L.

Figure 18:
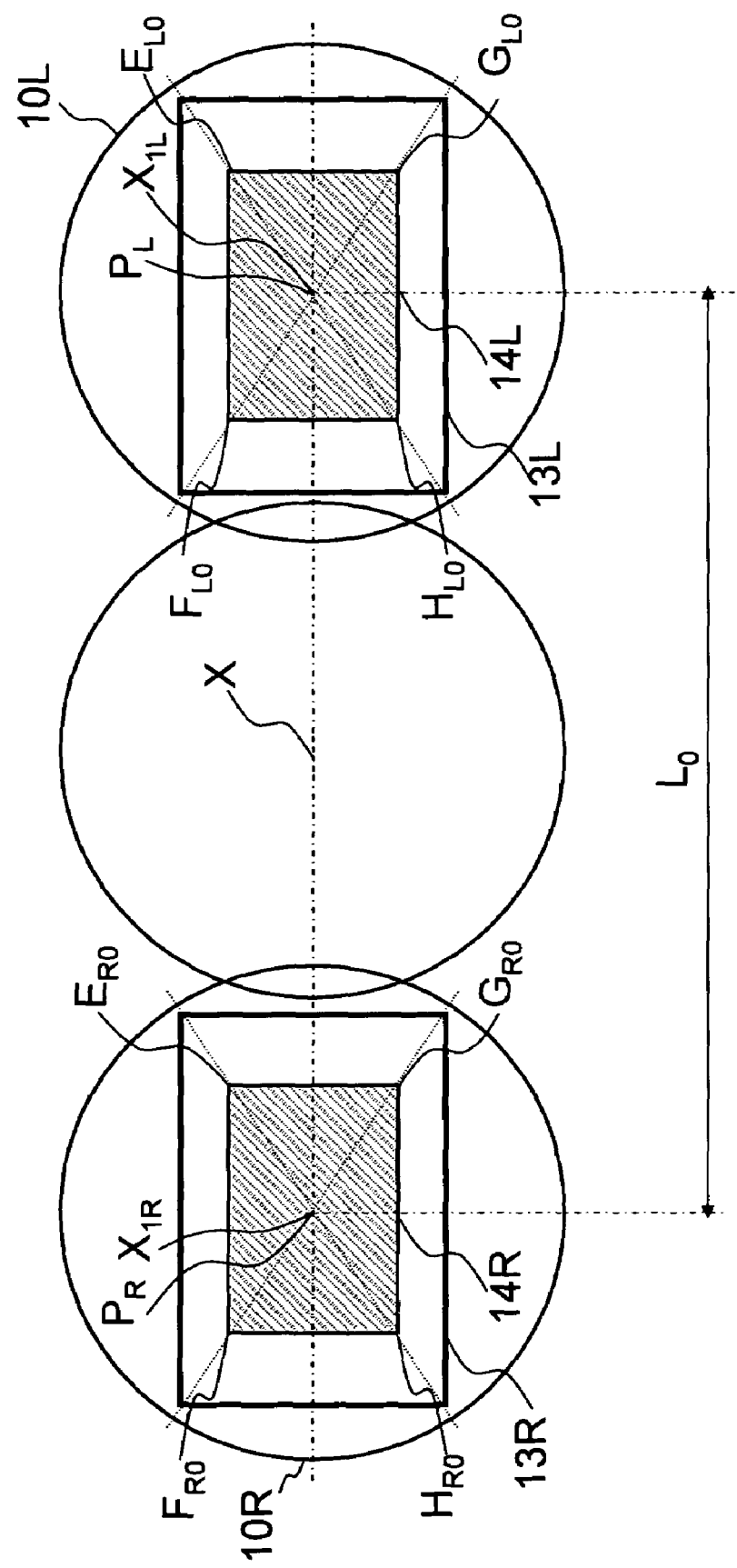
FIG. 18 is a plane view from the imaging units side of the binoculars of the third embodiment, showing an inclined condition of the imaging devices, and also the imaging fields, before the adjustment of an inter-pupillary distance.
Figure 19:
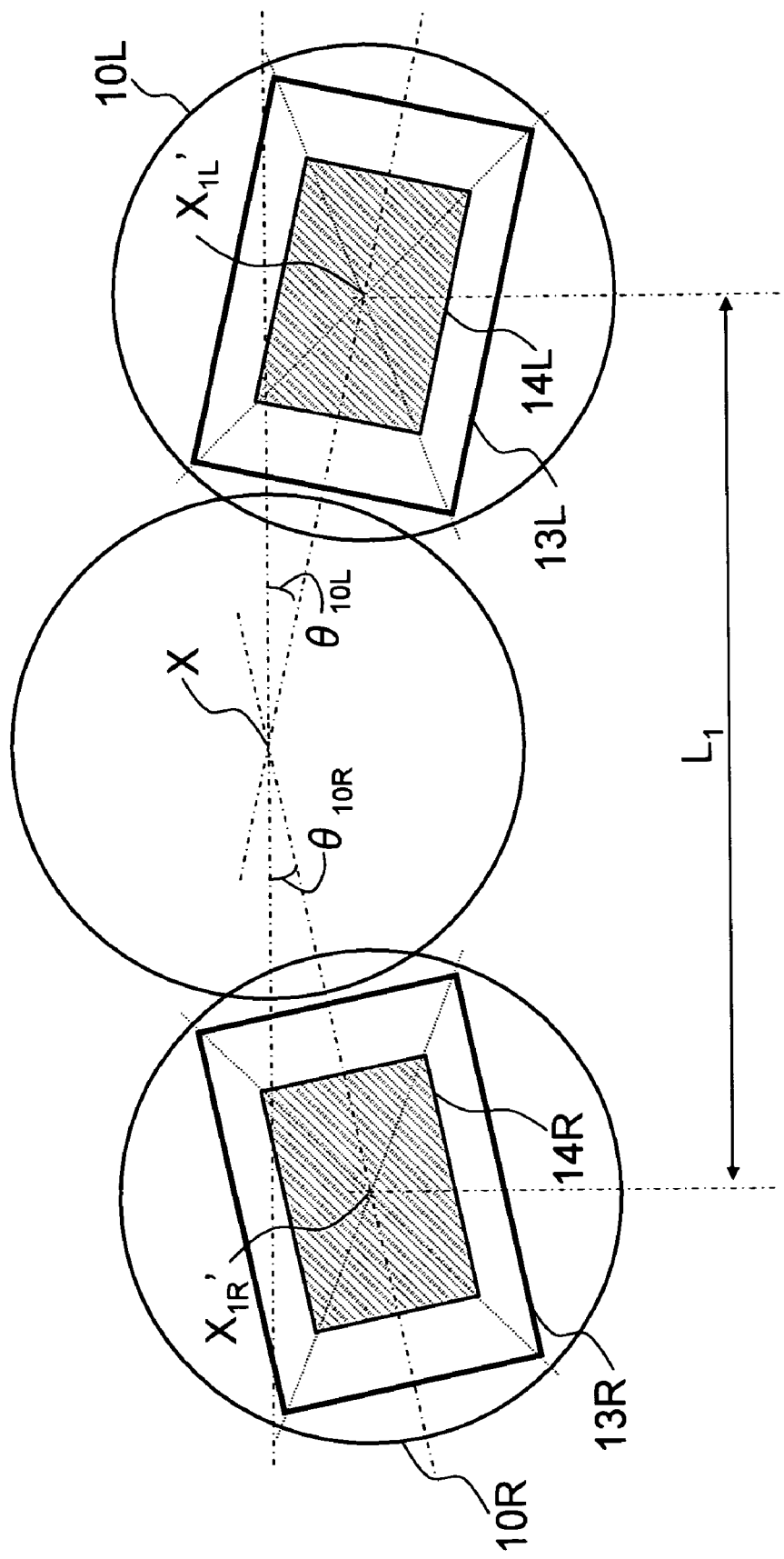
FIG. 19 is a plane view from the imaging units side of the binoculars of the third embodiment, showing an inclined condition of the imaging devices, and also the imaging fields, after the adjustment of an inter-pupillary distance.
Figure 20:
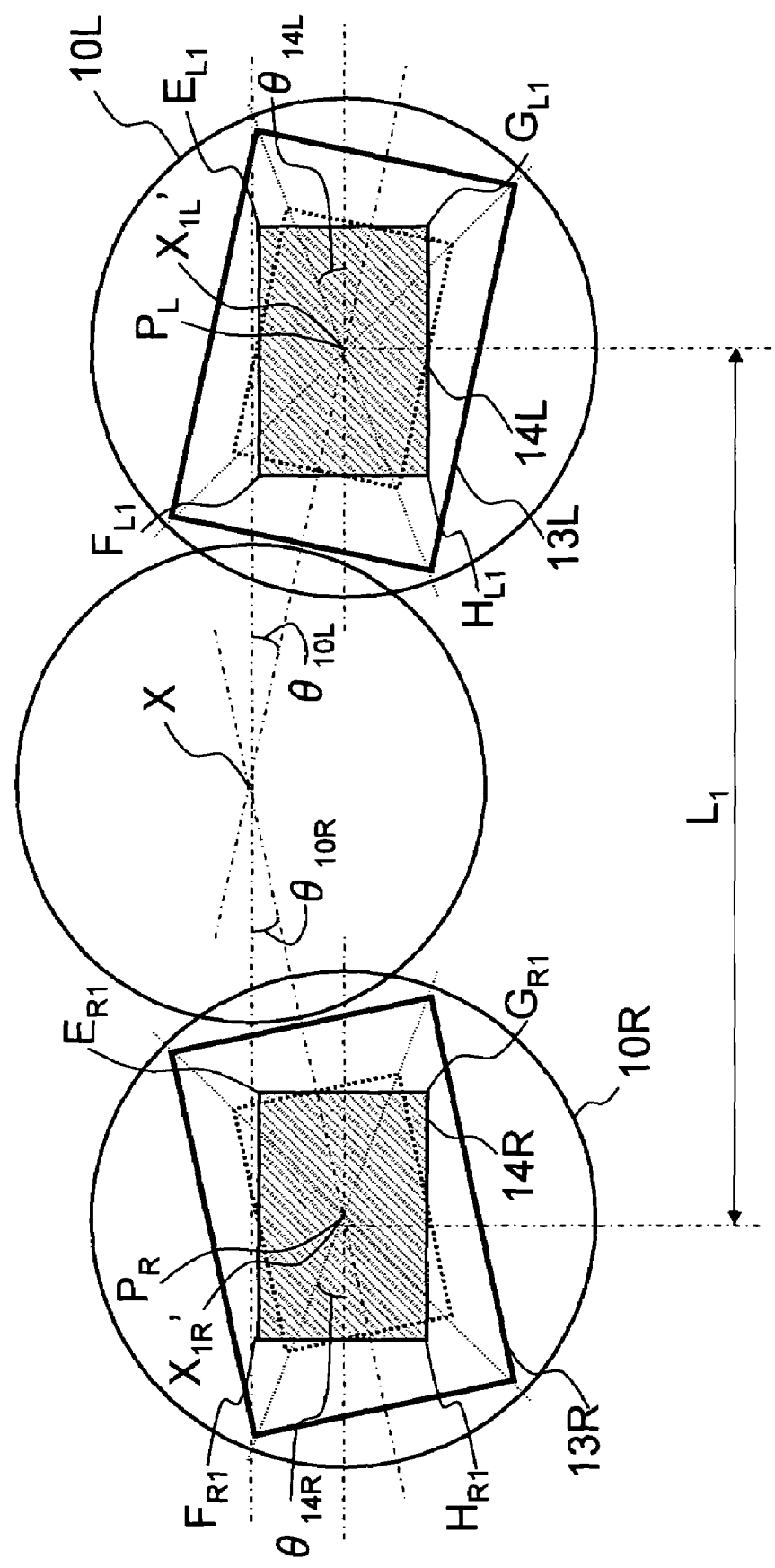
FIG. 20 is a plane view similar to that of FIG. 19, but where the inclined imaging fields are leveled horizontally, after the adjustment of an inter-pupillary distance.

The right imaging field 14R is able to rotate about an axis that passes through a center $P_R$ of the right imaging field 14R within a right effective imaging area of the right imaging device 13R, and which is parallel to the rotating axis X. The left imaging field 14L is able to rotate about an axis that passes through a center $P_L$ of the left imaging field 14L within a left effective imaging area of the left imaging device 13L, and that is parallel to the rotating axis X. As shown in FIGS. 18 to 20, in the third embodiment, a center of the right imaging device 13R and the center $P_R$ of the right imaging field 14R coincide with each other, to maximize the rotating range of the right imaging field 14R within the effective imaging area of the right imaging device 13R, so that the centers pass through the right imaging optical axis $X_{1R}$ or $X_{1R}'$. The relationship between the left imaging device 13L, the imaging field 14L, and also the left imaging optical axis $X_{1L}$ or $X_{1L}'$ is similar.

The electric signals for an optical image of an object, generated in the right imaging unit 10R are converted to image signals which can be displayed, after processing by the image-signal processing unit 50, and observed on the right ocular unit 30R, and are supplied to it. The electric signals for an optical image of an object, generated in the left imaging unit 10L are converted to image signals which can be displayed, after processing by the image-signal processing unit 50, and observed on the left ocular unit 30L, and are supplied to it.

The controller 60 has an imaging-field and image-indicating field rotating operation unit 61', which rotates the right and left imaging fields 14R and 14L within the effective imaging areas of the respective right and left imaging devices 13R and 13L, and which rotates the right and left image-indicating fields 34R and 34L within the effective image-indicating areas of the respective right and left image-indicating devices 33R and 33L.

The imaging-field and image-indicating field rotating operation unit 61' has operation buttons 61a' and 61b', and a sliding operation member 61c'.

When the operation button 61a' is pushed, the imaging-field and image-indicating field rotating operation unit 61' rotates the right and left imaging fields 14R and 14L in the opposite directions by the same angle, and rotates the right and left image-indicating fields 34R and 34L in the opposite directions at the same angle. The angle rotated by the right imaging field 14R due to the imaging-field and image-indicating field rotating operation unit 61' is the same as the angle rotated by the right image-indicating field 34R due to the imaging-field and image-indicating field rotating operation unit 61'.

When the operation button 61b' is pushed, the imaging-field and image-indicating field rotating operation unit 61' rotates the right and left imaging fields 14R and 14L in the opposite directions to which they were rotated when the operation button 61a' was pushed, and by the same angle by which they were rotated when the operation button 61a' was pushed. Further, when the operation button 61b' is pushed, the imaging-field and image-indicating field rotating operation unit 61' rotates the right and left image-indicating fields 34R and 34L in the opposite directions to which they were rotated when the operation button 61a' was pushed, and by the same angle by which they were rotated when the operation button 61a' was pushed.

When the sliding operation member 61c' is operated, an angle by which the imaging-field and image-indicating field rotating operation unit 61' rotates the right and left imaging fields 14R and 14L, and the right and left image-indicating fields 34R and 34L, is adjusted when either the operation button 61a' or 61b' is pushed once.

When the photographic subject images are captured by the right and left imaging units 10R and 10L, the operation of each component, that is indicated in the right and left ocular units 30R and 30L, is identical to that in the first embodiment. The photographic subject image captured by the right imaging unit 10R is indicated in the right ocular unit 30R, and the photographic subject image captured by the left imaging unit 10L is indicated in the left ocular unit 30L, because the electric binoculars relating to the third embodiment are provided with the right and left imaging units 10R and 10L.

When the respective right imaging unit 10R, left imaging unit 10L, right ocular unit 30R, and left ocular unit 30L are rotated about the rotating axis X, in the third embodiment, the respective right imaging field 14R, left imaging field 14L, right image-indicating field 34R, and left image-indicating field 34L which are included to the respective right imaging device 13R, left imaging device 13L, right image-indicating device 33R, and left image-indicating device 33L are rotated at the same time. Accordingly, the right and left imaging fields 14R and 14L are inclined, and the right and left image-indicating fields 34R and 34L are inclined.

FIGS. 4 and 18 show the condition where the inter-pupillary distance is maximum. This condition is the initial state, so that the value of the inter-pupillary distance in this position is $L_0$. The right image-indicating field 34R is defined as the field which is enclosed between the boundaries given by the 4 points $A_{RO}$, $B_{RO}$, $C_{RO}$, and $D_{RO}$. Similarly, the left image-indicating field 34L is defined as the field which is enclosed between the boundaries given by the 4 points $A_{LO}$, $B_{LO}$, $C_{LO}$, and $D_{LO}$. Similarly, the right imaging field 14L is defined as the field which is enclosed between the boundaries given by the 4 points $E_{RO}$, $F_{RO}$, $G_{RO}$, and $H_{RO}$. Similarly, the left imaging field 14L is defined as the field which is enclosed between the boundaries given by the 4 points $E_{LO}$, $F_{LO}$, $G_{LO}$, and $H_{LO}$.

The coordinates of each point are computed when the imaging-field and image-indicating field rotating operation unit 61' rotates each point that is shown in the respective right and left imaging fields 14R and 14L in this initial state, about their respective centers $P_R$ and $P_L$, according to a prescribed computation process, and then the imaging-field and image-indicating field rotating operation unit 61' provides the imaging fields after the rotation. Similarly, the coordinates of each point are computed when the imaging-field and image-indicating field rotating operation unit 61' rotates each point that is shown in the respective right and left image-indicating fields 34R and 34L in this initial state, about their respective centers $Q_R$ and $Q_L$, according to a prescribed computation process, and then the imaging-field and image-indicating field rotating operation unit 61' provides the image-indicating fields after the rotation.

Therefore, the operation button 61a' is pushed by the observer, to horizontally level the inclined right imaging field 14R, left imaging field 14L, right image-indicating field 34R, and left image-indicating field 34L. The value of the rotating angle, determined by the number of times by which the operation button 61a' or 61b' is pushed, is obtained from the substitution table shown in FIG. 7.

Each point $E_{R0}$, $F_{R0}$, $G_{R0}$, and $H_{R0}$ that is shown in the right imaging field 14R in the initial state, is a right initial value. Each point $E_{L0}$, $F_{L0}$, $G_{L0}$, and $H_{L0}$ that is shown in the left imaging field 14L in the initial state is a left initial value. Each point $E_{R0}$, $F_{R0}$, $G_{R0}$, and $H_{R0}$ is rotated by a requested angle about an axis which passes through the center $P_R$ of the right imaging field 14R, and which is parallel to the rotating axis X. Each point $E_{R1}$, $F_{R1}$, $G_{R1}$, and $H_{R1}$ is shown in the right imaging field 14R after the rotation. Each point $E_{L0}$, $F_{L0}$, $G_{L0}$, and $H_{L0}$ is rotated by a requested angle about an axis which passes through the center $P_L$ of the left imaging field 14L, and which is parallel to the rotating axis X. Each point $E_{L1}$, $F_{L1}$, $G_{L1}$, and $H_{L1}$ is shown in the left imaging field 14L after the rotation. The requested angle of rotation for the right imaging field 14R and the requested angle of rotation for the left imaging field 14L have the same value, but are in opposite directions. The imaging-field and image-indicating field rotating operation unit 61' computes the coordinates of each point $E_{R1}$, $F_{R1}$, $G_{R1}$, $H_{R1}$, $E_{L1}$, $F_{L1}$, $G_L$, and $H_{L1}$, and decides the right and left imaging fields 14R and 14L after the rotation.

Each point $A_{R0}$, $B_{R0}$, $C_{R0}$, and $D_{R0}$ that is shown in the right image-indicating field 34R in the initial state, is a right initial value. Each point $A_{L0}$, $B_{L0}$, $C_{L0}$, and $D_{L0}$ that is shown in the left image-indicating field 34L in the initial state is a left initial value. Each point $A_{R0}$, $B_{R0}$, $C_{R0}$, and $D_{R0}$ is rotated by a requested angle about an axis which passes through the center $Q_R$ of the right image-indicating field 34R, and which is parallel to the rotating axis X. Each point $A_{R1}$, $B_{R1}$, $C_{R1}$, and $D_{R1}$ is shown in the right image-indicating field 34R after the rotation. Each point $A_{L0}$, $B_{L0}$, $C_{L0}$, and $D_{L0}$ is rotated by a requested angle about an axis which passes through the center $Q_L$ of the left image-indicating field 34L, and which is parallel to the rotating axis X. Each point $A_{L1}$, $B_{L1}$, $C_{L1}$, and $D_{L1}$ is shown in the left image-indicating field 34L after the rotation. The requested angle of rotation for the right image-indicating field 34R and the requested angle of rotation for the left image-indicating field 34L are same value, but are in opposite directions. The imaging-field and image-indicating field rotating operation unit 61' computes the coordinates of each point $A_{R1}$, $B_{R1}$, $C_{R1}$, $D_{R1}$, $A_{L1}$, $B_{L1}$, $C_{L1}$, and $D_{L1}$, and decides the right and left image-indicating fields 34R and 34L after the rotation.

The imaging field 14R and 14L are rotated by the same angle, but in opposite directions, when the observer pushes the operation button 61a' or 61b' (see FIG. 20). The image-indicating field 34R and 34L are rotated by the same angle, but in opposite directions, when the observer pushes the operation button 61a' or 61b' (see FIG. 6). Therefore, the right imaging field 14R and the right image-indicating field 34R are rotated by the same angle in the same direction, viewed from the same side. It is possible to carry out the operation that horizontally levels the inclined right imaging field 14R, left imaging field 14L, right image-indicating field 34R, and left image-indicating field 34L by using the eye of the observer; that is, by simply looking at the right and left image-indicating devices 33R and 33L in the respective right and left ocular units 30R and 30L.

Consequently, according to the third embodiment, when the right imaging unit 10R, left imaging unit 10L, right ocular unit 30R, and left ocular unit 30L are rotated about the rotating axis X, so that the right imaging device 13R, left imaging device 13L, right image-indicating device 33R, and left image-indicating device 33L are inclined, the observer can observe comfortably because the imaging fields 14R and 14L, on which the optical images are projected, and the image-indicating fields 34R and 34L, on which the images are indicated, are horizontally leveled by observer.

The controller 60 relating to the third embodiment is provided with the imaging-field and image-indicating field rotating operation unit 61', so that the right imaging field 14R, left imaging field 14L, right image-indicating field 34R, and left image-indicating field 34L are horizontally leveled by the imaging-field and image-indicating field rotating operation unit 61', in a similar way to that of the controller 60 in the first embodiment. However, instead of the imaging-field and image-indicating field rotating operation unit 61', the controller 60 may be provided with an angle of rotation sensor 62' for the imaging units and the ocular units, and an automatic imaging-field and image-indicating field rotating unit 63', so that the right imaging field 14R, left imaging field 14L, right image-indicating field 34R, and left image-indicating field 34L are horizontally leveled automatically, like the controller 60 relating to the second embodiment.

This angle of rotation sensor 62' for the imaging units and ocular units, is the apparatus that detects the rotation angle of one of the right imaging unit 10R, left imaging unit 10L, right ocular unit 30R, and left ocular unit 30L. The automatic imaging-field and image-indicating field rotating unit 63' horizontally levels the inclined right imaging field 14R, left imaging field 14L, right image-indicating field 34R, and left image-indicating field 34L by using the detected angle.

The method of the rotation of the imaging units and the ocular units for adjusting the inter-pupillary distance is a 1-axial rotary system. The pivot of the rotation is the imaging optical axis $X_1$ in the first and second embodiments, or the rotating axis X in the third embodiment. However, the pivot of the rotation may be an ocular axis which is parallel to the imaging optical axis $X_1$ in the first and second embodiments, or the rotating axis X in the third embodiment. Furthermore, instead of a 1-axial rotary system, a 2-axial rotary system, where the pivot of the rotation is independent for the left imaging unit and the right imaging unit, and for the left ocular unit and the right ocular unit, may be used in the above embodiments.

The distance from the imaging optical axis $X_1$ to the right ocular optical axis $X_{3R}$ is the same as the distance from the imaging optical axis $X_1$ to the left ocular optical axis $X_{3L}$ in the first and second embodiments. The distance from the rotating axis X to the right ocular optical axis $X_{3R}$ is the same as the distance from the rotating axis X to the left ocular optical axis $X_{3L}$, and the distance from the rotating axis X to the right imaging optical axis $X_{1R}$ is the same as the distance from the rotating axis X to the left imaging optical axis $X_{1L}$ in the third embodiment. However, these distances do not have to be the same. If each rotation angle for the right imaging unit, left imaging unit, right ocular unit, and left ocular unit, is detected in independently, and if each value for the rotation angles of the right imaging field, left imaging field, right image-indicating field, and left image-indicating field, are computed independently, the same effects are obtained.

The movements of the right imaging field 14R, left imaging field 14L, right image-indicating field 34R, and left image-indicating field 34L are not limited to rotating about their axes which pass through their centers, and which are parallel to the imaging optical axis. The right imaging field 14R, left imaging field 14L, right image-indicating field 34R, and left image-indicating field 34L can also be horizontally leveled by moving toward a side direction and length direction, within their effective imaging area or effective image-indicating area.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2003-177296 (filed on Jun. 20, 2003), which is expressly incorporated herein by reference, in its entirety.

The invention claimed is:

1. Electronic binoculars, comprising:
an imaging unit that has an imaging device that projects an optical image of an object, obtained by a photographing optical system, and converts said optical image to electric signals;
a first ocular unit that has a first image-indicating device that indicates the object image based on said electric signals in a first image-indicating field; and
a second ocular unit that has a second image-indicating device that indicates the object image based on said electric signals in a second image-indicating field;
said first image-indicating field being smaller than a first effective image-indicating area which is the maximum image-indicating area of said first image-indicating device;
said second image-indicating field being smaller than a second effective image-indicating area which is the maximum image-indicating area of said second image-indicating device;
said first image-indicating field being able to move within said first effective image-indicating area; and
said second image-indicating field being able to move within said second effective image-indicating area.

2. The binoculars according to claim 1, wherein said first and second image-indicating fields move in accordance with a distance between said first ocular unit and said second ocular unit.

3. The binoculars according to claim 2, wherein said imaging unit has an imaging optical axis;
said first ocular unit has a first ocular optical axis;
said second ocular unit has a second ocular optical axis;
said imaging optical axis is parallel to said respective first and second ocular optical axes; and said binoculars comprising:
an ocular unit rotating device that rotates said first and second ocular units about an ocular axis parallel to said imaging optical axis; and
an image-indicating field rotating device that rotates said first image-indicating field about a first field axis that passes approximately through the center of said first image-indicating field, and that is parallel to said imaging optical axis, and rotates said second image-indicating field about a second field axis that passes approximately through the center of said second image-indicating field, and that is parallel to said imaging optical axis.

4. The binoculars according to claim 3, wherein said image-indicating field rotating device has a rotation angle detecting device that detects a first rotation angle of said first ocular unit and a second rotation angle of said second ocular unit;
said image-indicating field rotating device rotating said first image-indicating field in an opposite direction to the rotation of said first ocular unit, about said first field axis, according to said first rotation angle; and
said image-indicating field rotating device rotating said second image-indicating field in an opposite direction to the rotation of said second ocular unit, about said second field axis, according to said second rotation angle.

5. The binoculars according to claim 2, wherein said imaging unit has an imaging optical axis;
said first ocular unit has a first ocular optical axis;
said second ocular unit has a second ocular optical axis;
said imaging optical axis is parallel to said first ocular optical axis and said second ocular optical axis;
a distance from said imaging optical axis to said first ocular optical axis being the same as a distance from said imaging optical axis to said second ocular optical axis; and said binoculars comprising:
an ocular unit rotating device that rotates said first and second ocular units about said imaging optical axis; and
an image-indicating field rotating device that rotates said first image-indicating field about a third field axis that passes through the center of said first image-indicating field, and that is parallel to said imaging optical axis, and rotates said second image-indicating field about a fourth field axis that passes through the center of said second image-indicating field, and that is parallel to said imaging optical axis.

6. The binoculars according to claim 5, further comprising a rotation angle detecting device that detects a rotation angle of said first ocular unit;
said image-indicating field rotating device rotating said first image-indicating field in the opposite direction to the rotation of said first ocular unit, and about said third field axis, according to said rotation angle;
said image-indicating field rotating device rotating said second image-indicating field in the same direction to the rotation of said first ocular unit, and about said fourth field axis, according to said rotation angle.

7. The binoculars according to claim 1, further comprising:
an image-indicating field leveling device that levels said first image-indicating field horizontally, and levels said second image-indicating field horizontally.

8. Electronic binoculars, comprising:
a first imaging unit that has a first imaging device that projects an optical image of an object to a first imaging field, obtained by a photographing optical system, and converts said optical image to electric signals;
a second imaging unit that has a second imaging device that projects an optical image of an object to a second imaging field, obtained by a photographing optical system, and converts said optical image to electric signals;
a first ocular unit that has a first image-indicating device that indicates the object image based on said electric signals, in a first image-indicating field; and
a second ocular unit that has a second image-indicating device that indicates the object image based on said electric signals, in a second image-indicating field;
said first imaging field being smaller than a first effective imaging area which is the maximum imaging area of said first imaging device;
said second imaging field being smaller than a second effective imaging area which is the maximum imaging area of said second imaging device;
said first imaging field being able to move within said first effective imaging area; and
said second imaging field being able to move within said second effective imaging area.

* * * * *